INVENTORS H. KOHN
C. H. SCHARDT
BY
F.R. McCorkendale
ATTORNEY

Sept. 19, 1967 H. KOHN ETAL 3,342,934

PRIVATE BRANCH EXCHANGE TELEPHONE SYSTEM WITH DIAL TRANSFER FACILITIES

Filed Sept. 2, 1964 18 Sheets-Sheet 3

Sept. 19, 1967 H. KOHN ET AL 3,342,934

PRIVATE BRANCH EXCHANGE TELEPHONE SYSTEM WITH DIAL TRANSFER FACILITIES

Filed Sept. 2, 1964

18 Sheets-Sheet 6

Sept. 19, 1967 H. KOHN ETAL 3,342,934

PRIVATE BRANCH EXCHANGE TELEPHONE SYSTEM WITH DIAL TRANSFER FACILITIES

Filed Sept. 2, 1964

18 Sheets-Sheet 14

United States Patent Office 3,342,934

Patented Sept. 19, 1967

3,342,934

PRIVATE BRANCH EXCHANGE TELEPHONE SYSTEM WITH DIAL TRANSFER FACILITIES

Harry Kohn, Rahway, and Courtney H. Schardt, Short Hills, N.J., assignors to Bell Telephone Laboratories, Incorporated, New York, N.Y., a corporation of New York Filed Sept. 2, 1964, Ser. No. 393,911
13 Claims. (Cl. 179—18)

This invention relates to a telephone system and more particularly to an automatic telephone system which includes a private branch exchange.

Direct inward dialing, a service introduced comparatively recently but already widely used, permits direct dialing by telephone customers to extensions of a PBX without intervention on the part of the PBX operator or attendant. This results in speedier service to the customer, a lessening of the work load of the PBX attendants, and many other advantages. However, one disadvantage has resulted, namely the difficulty involved in having an incoming call transferred from the answering PBX extension to another extension on occasions when such action is desirable.

Before the advent of direct inward dialing when the call to the PBX extension was completed by the PBX attendant, it was a simple matter for the customer to recall the attendant by a switchhook flash whereby to request the attendant to transfer the call. With the advent of direct inward dialing, however, where the call is completed exclusive of the attendant's position circuit, the matter of call transfer has presented certain problems, and arrangements priorly proposed for solving these problems have involved expensive and space consuming equipment and usually have been of a nature where the attendant is ultimately called in on the connection in order to make the transfer. This has, of course, defeated to some extent the purposes of the direct inward dialing service. It is desirable also, of course, in those PBX's where the calls are completed by attendants, to lessen the work load of the attendants as much as feasible. One way of doing this is to eliminate the necessity of attendants' participation in the transfer of calls or at least to materially reduce the extent of such participation.

Accordingly, it is an object of our invention to improve the operation of private branch exchanges.

A more specific object of the invention is to transfer incoming calls from a first PBX extension to another extension under control of the first extension.

Another object of the invention is to improve call transfer circuits from the standpoint of efficiency whereby to reduce the cost and the space requirements of such circuits.

When new features such as automatic call transfer are being incorporated in present day private branch exchanges there is involved, in addition to the obvious item of additional cost, the matter of providing the necessary space for the additional equipment. Indeed this is frequently the major problem encountered since the basic PBX layout is usually precisely engineered from a space standpoint in the first instance. Accordingly it becomes obvious that efficient utilization of the elements of such added equipment is essential if the provision of the additional service is to be feasible.

In accordance with a specific embodiment of the invention, a plurality of station dial transfer trunk circuits, for example five, are provided for serving a larger number of central office trunk circuits, for example forty. A controller circuit functions to connect an idle transfer trunk circuit to a central office trunk upon a transfer request, the assignment of transfer trunks being made through a preference circuit.

Assuming that an outside party A is connected over a central office trunk to a first PBX extension B and that party B concludes that the call should be transferred to a second PBX extension C, extension B flashes whereupon the central office trunk is split, a bridge is placed across the line end for holding party A, and a transfer trunk, selected by the controller, is connected through the office end of the split central office trunk to extension B. A register is now attached to the "free" end of the transfer trunk and party B, after receiving dial tone, dials the code of extension C. When extension C responds, extensions B and C may converse and, if desired, either extension may flash to operate a "cut-through" relay and bring in station A on a three-way connection.

Now if extension C goes on hook, the original connection of A and B through the central office trunk is reestablished and the transfer trunk is released. However, in the event extension B goes on hook, station A and extension C will then be connected through the transfer trunk and the line end of the central office trunk. If extension C desires to make a further transfer to extension D, this may be done by utilizing the transfer trunk operating in the opposite direction and the office end of the central office trunk, (now free as extension B has gone on hook) for dialing the code of extension D by extension C.

A feature of the invention is the assignment of the control of transfers between extensions to the transfer trunk and to the central office trunk in alternating succession whereby to permit an unlimited number of transfers and to attain highly efficient untilization of the transfer trunk.

A further feature of the invention is means for preventing the outside party from being given access to an outside trunk through a transfer effected by one of the PBX extensions.

Yet another feature of the invention is means whereby an extension attempting a connection to another extension preparatory to a possible transfer and finding the extension in a busy or don't-answer condition, may effect return to the original connection by a switchhook flash.

A still further feature of the invention is a group preference relay circuit which includes a pulse divider circuit whereby the order of preference of the group relays is changed during each operation.

A full understanding of the arrangement contemplated by the present invention as well as an appreciation of the various advantageous features thereof may be gained from consideration of the following detailed description in connection with the accompanying drawing in which.

The arrangement and operation of the various components of the illustrative embodiment of the invention will be described in detail subsequently with reference to FIGS. 2 to 17. However, in order to first gain a general overall understanding of the arrangement contemplated, a brief general description will be given at this time with reference to FIG. 1.

Figure 1:
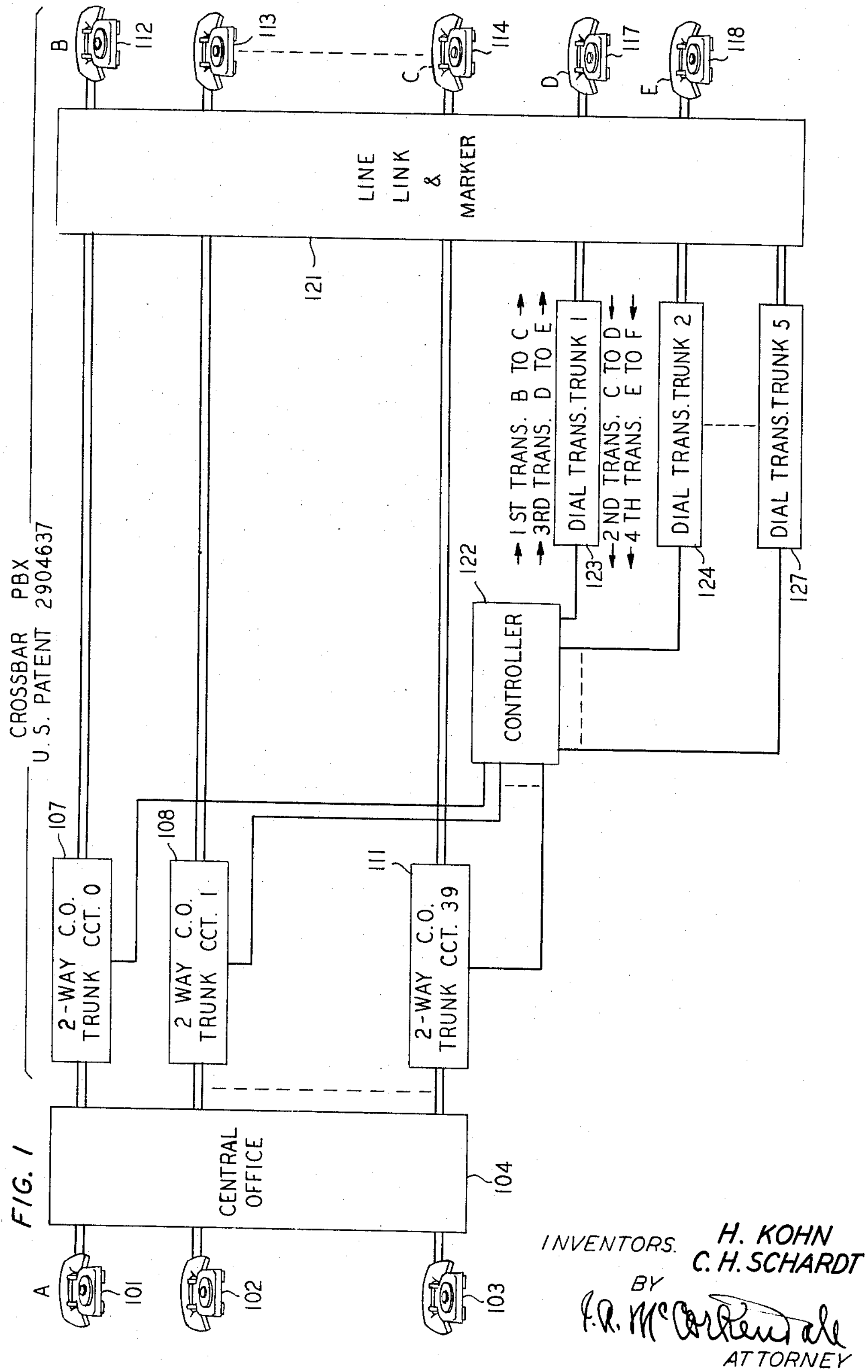
FIG. 1 shows schematically the arrangement and relationship of certain of the basic individual circuits which comprise one specific illustrative embodiment of the system contemplated by the invention.
Figure 2:
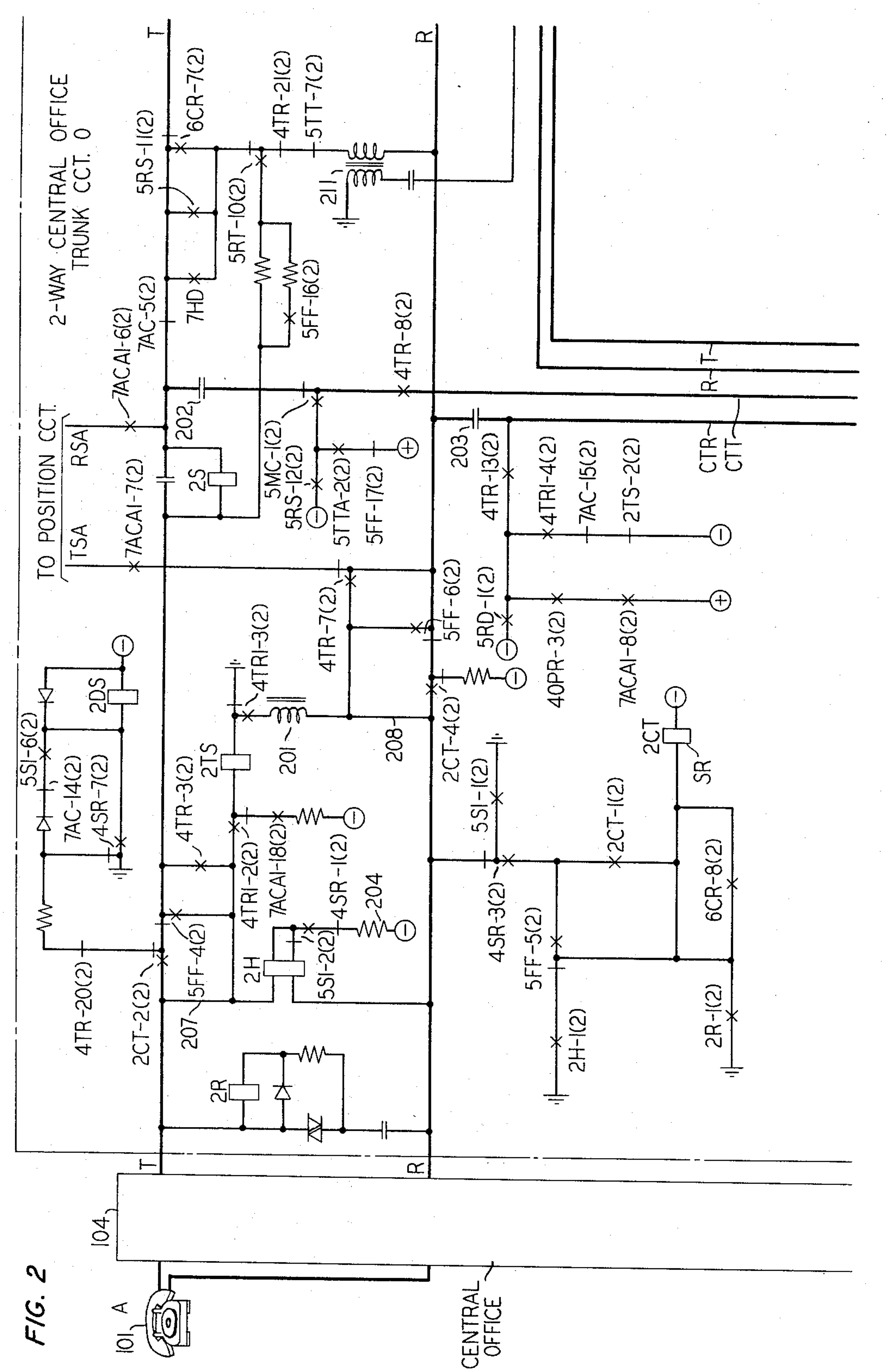
FIGS. 2, 3, 4, 5, 6, 7 and 8 show particularly the two-way central office trunks, one trunk circuit being shown in detail and the others being indicated by captioned boxes and broken lines.
Figure 3:
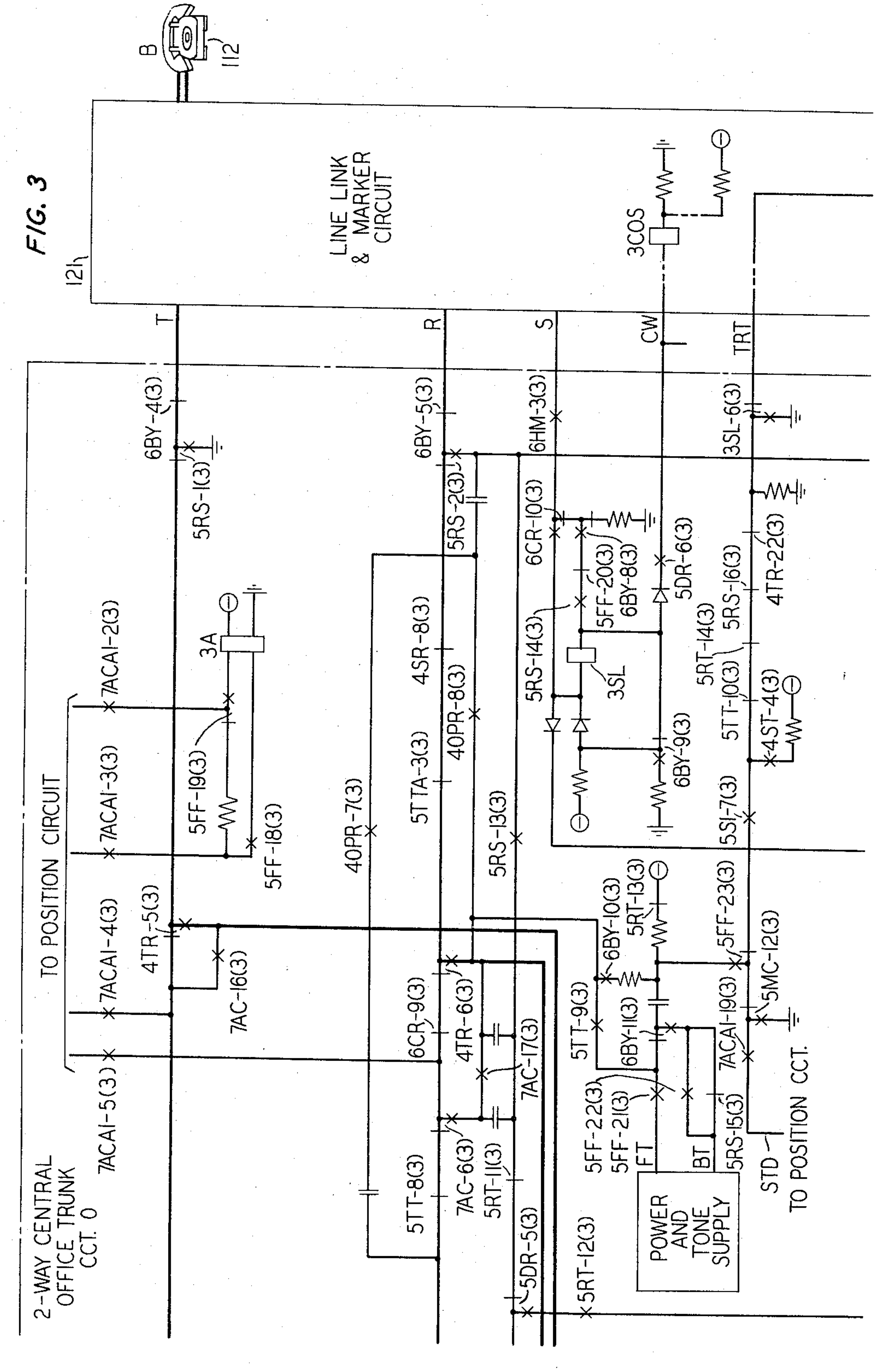
Figure 4:
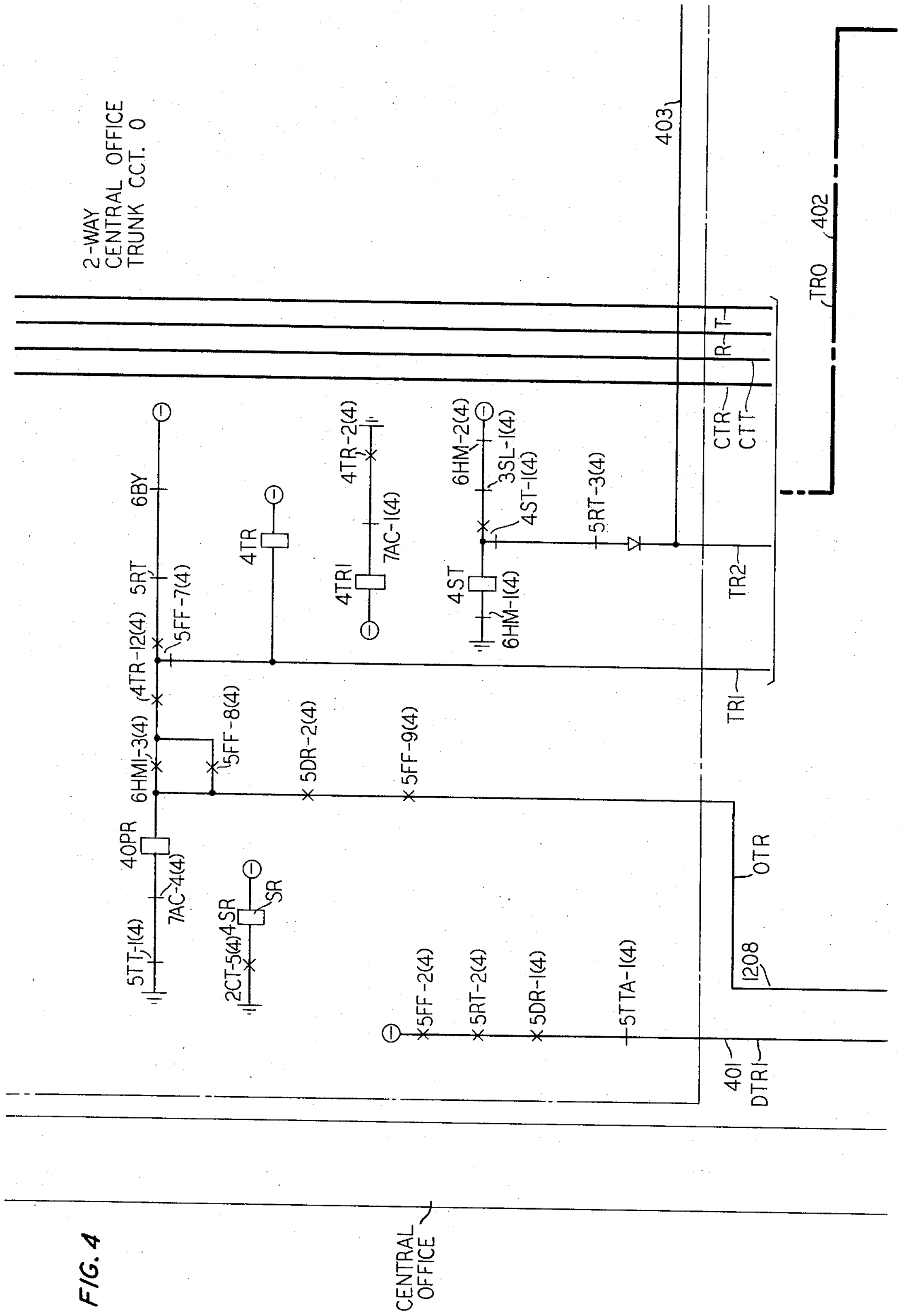
Figure 5:
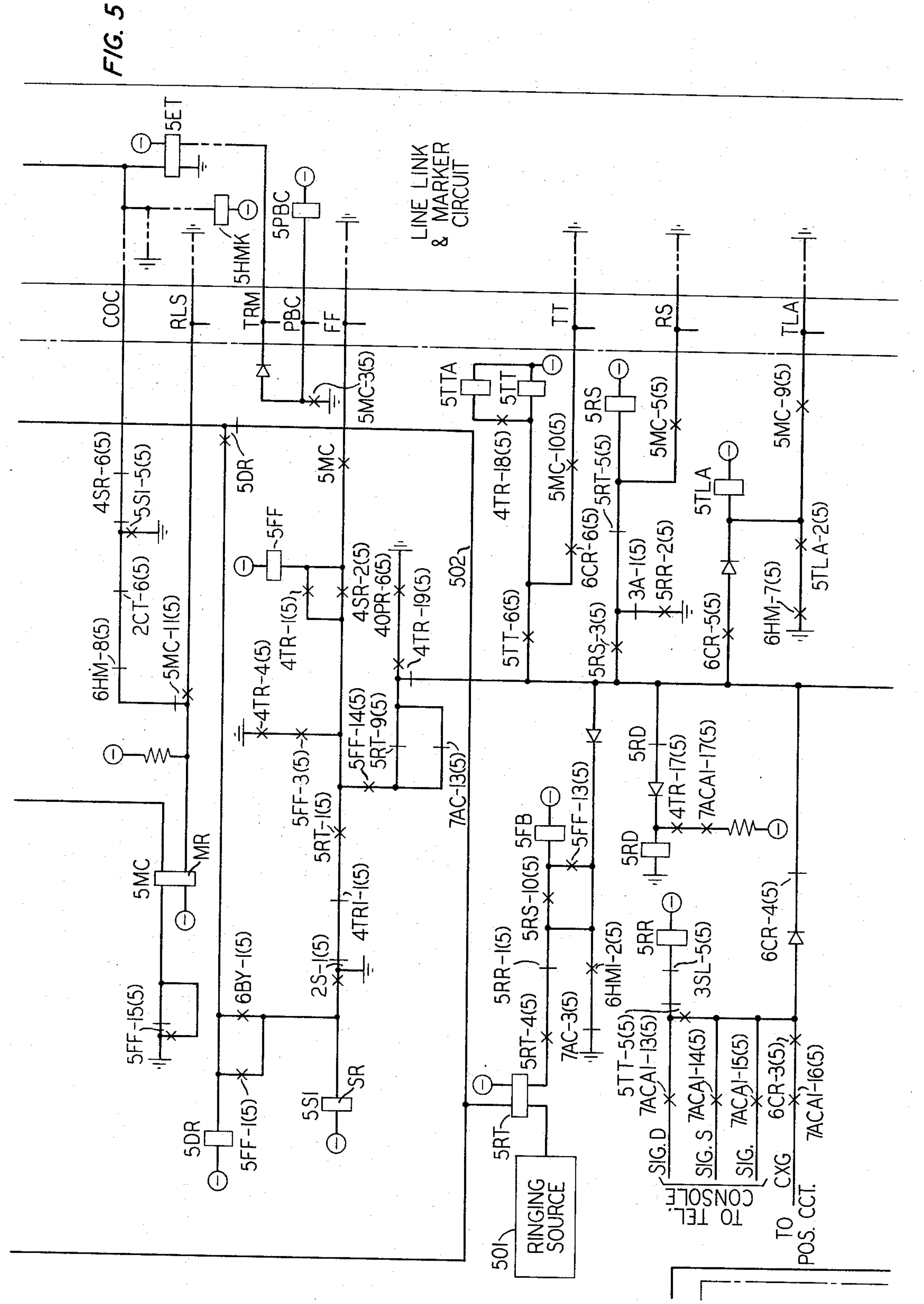
Figure 6:
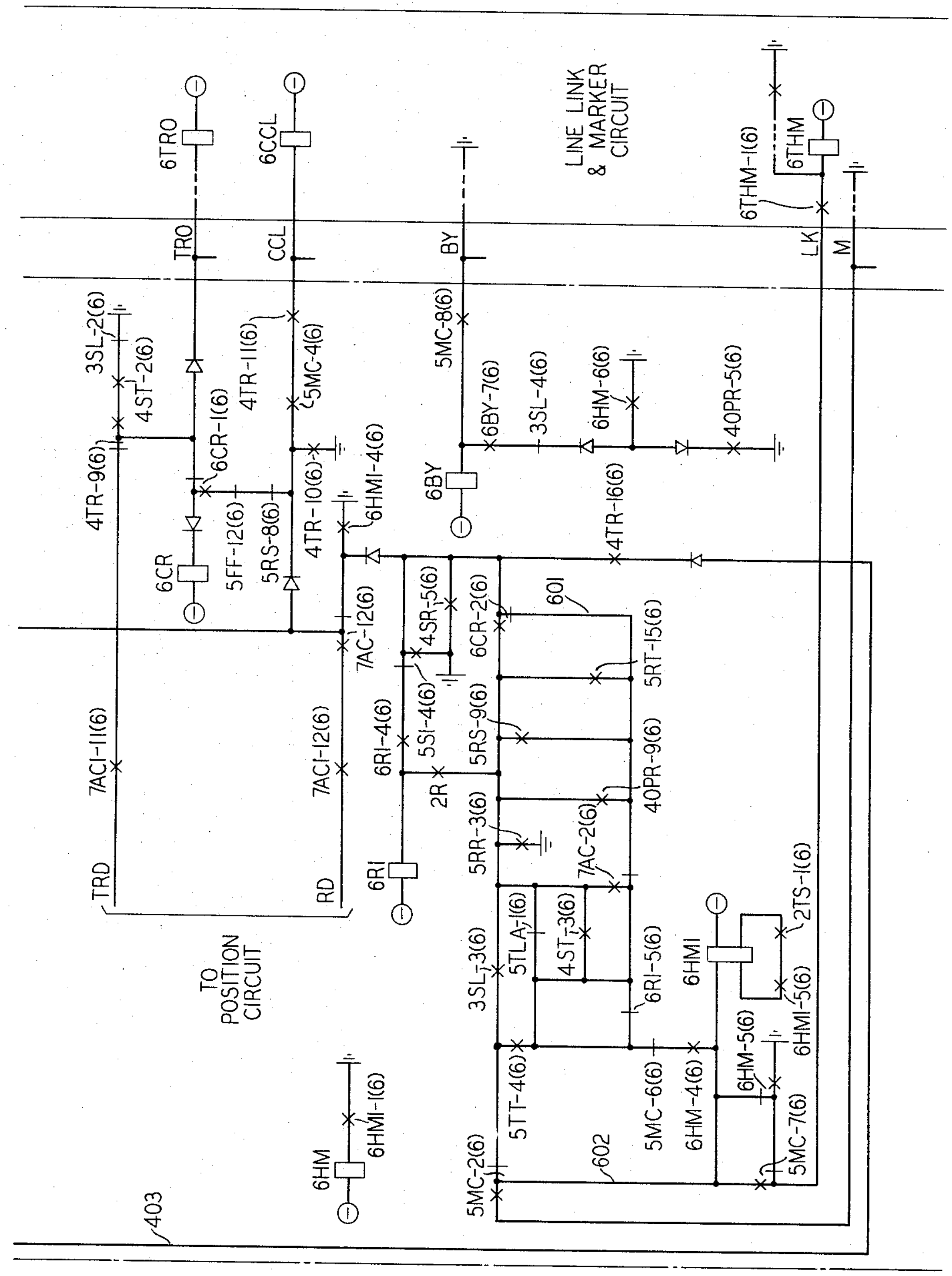
Figure 7:
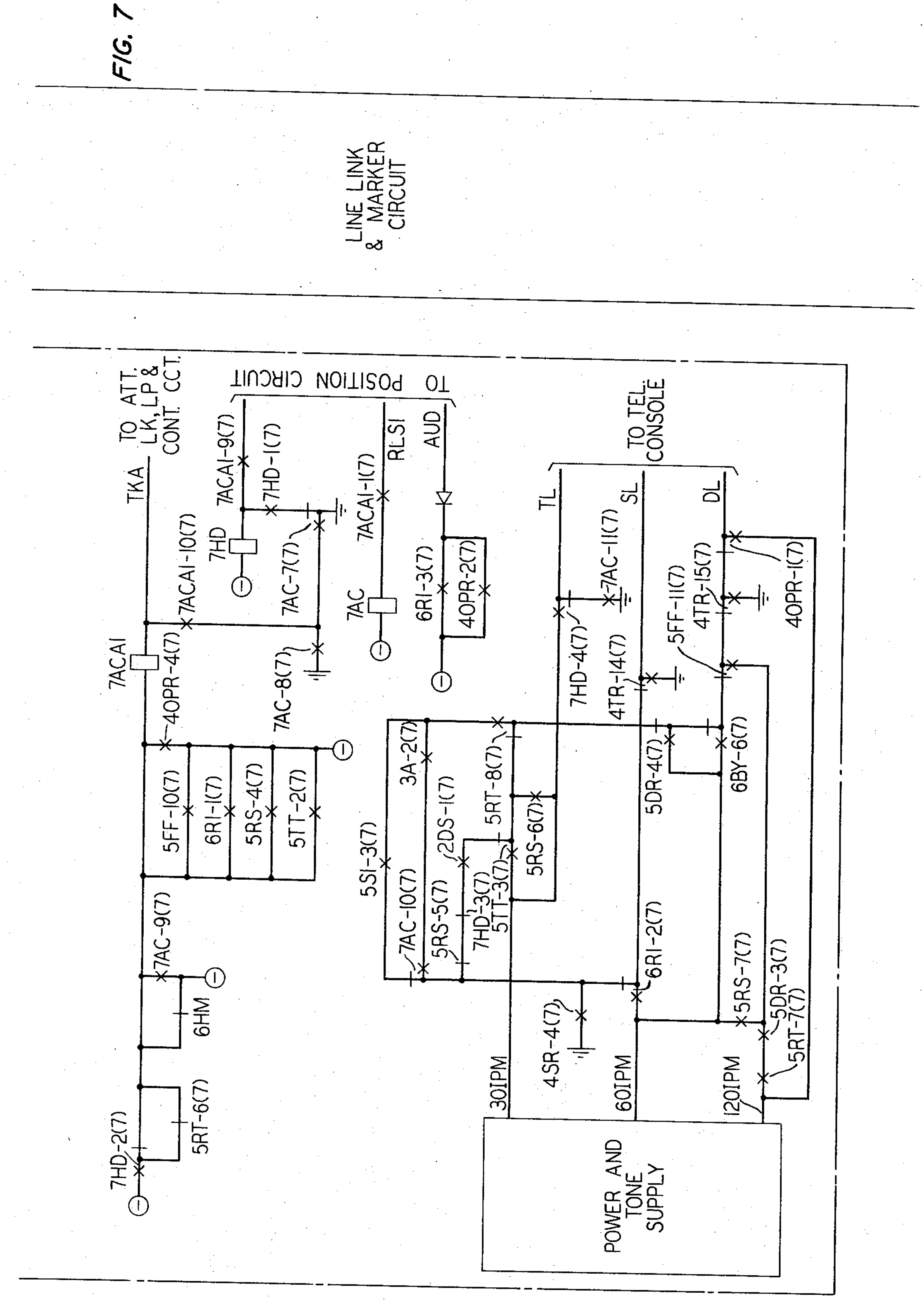
Figure 8:
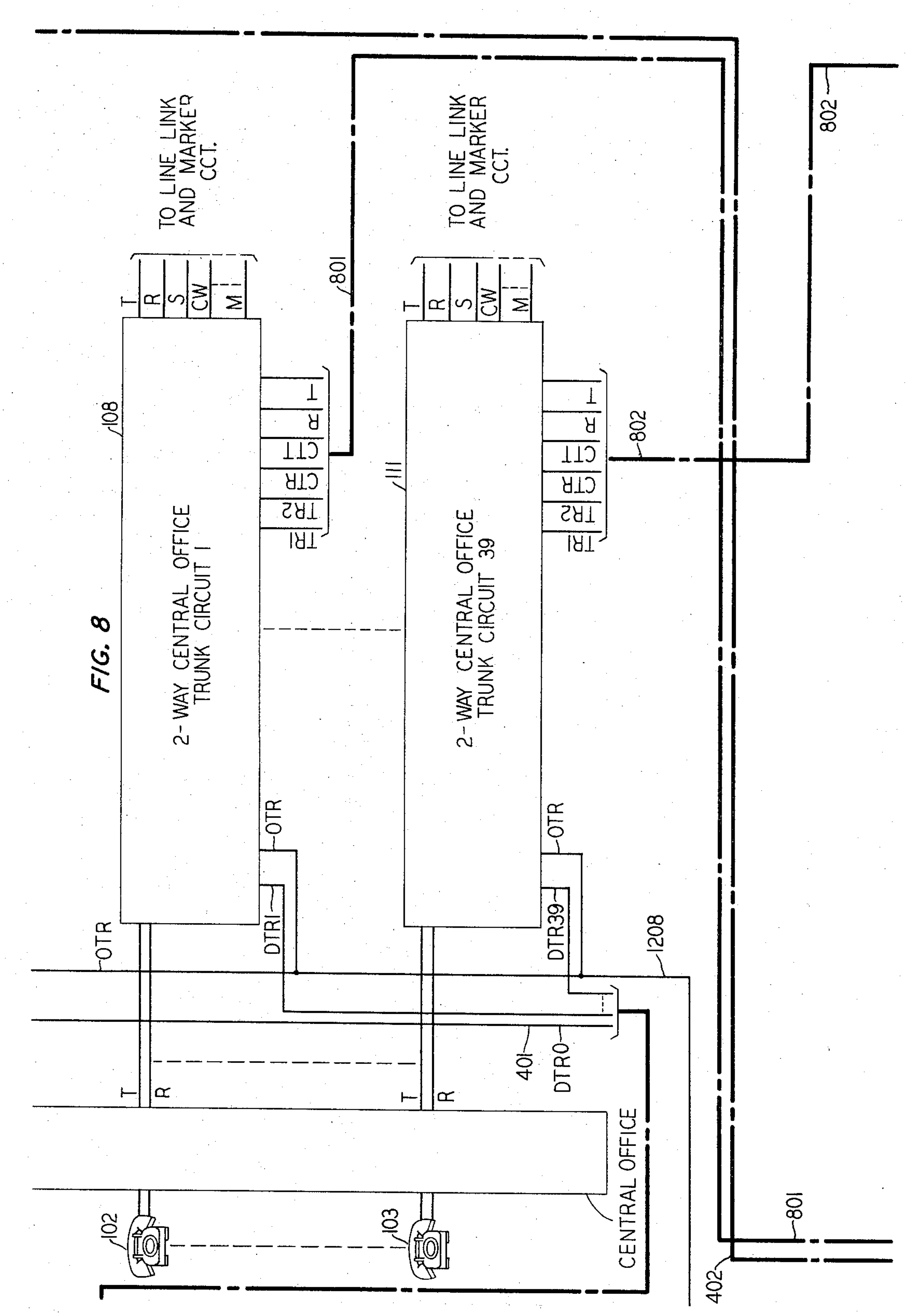

Referring to FIG. 1, therefore, "outside" stations 101, 102 and 103 are shown connected through a central office represented by captioned box 104 to a private branch exchange which will be assumed to be of the crossbar type disclosed, for example, in R. D. Williams Patent 2,904,637, issued Sept. 15, 1959. The dial transfer arrangement contemplated by the invention is particularly adapted for use in conjunction with the basic switching and controlling circuits fully described in the Williams patent and such circuits will be described herein only to the extent necessary for full understanding of the present invention.

It will be understood, of course, that the stations shown, 101, 102 and 103, are merely typical of the many similar stations involved; station 101 may be referred to in subsequent description as "outside station A" or "calling station A."

At the PBX the first, second and last of a group of forty two-way central office trunks are represented by captioned boxes 107, 108 and 111, intervening trunks being indicated by the dotted lines. Five PBX extensions 112, 113, 114, 117 and 118 are shown as typical, intervening extensions being indicated by the dotted lines. Connections to these extensions are completed through the line, link and marker circuit, represented by captioned box 121 in the general manner fully described in the Williams Patent 2,904,637 referred to above.

The controller is shown as captioned box 122 and the first, second and last of the five dial transfer trunks are shown as captioned boxes 123, 124 and 127. The intervening dial transfer circuits are represented by the dotted lines.

It will be assumed now for purposes of further description that outside station 101, that is "outside station A," has been connected in the usual manner through the central office 104 to the private branch exchange and through the two-way central office trunk 107 of the PBX to PBX extension 112, that is "extension B," the line, link and marker circuit 121 functioning in this connection in its normal manner as disclosed, for example, in the Williams Patent 2,904,637 referred to above.

It will be assumed, further, that, after the above connection has been established and the respective parties at station A and extension B converse, the party at extension B decides that the call could be better handled by another extension, possibly extension 114, that is "extension C." (It might, of course, also be the case that extension B had been dialed in error and that station A actually had intended to call extension C in the first place.) Accordingly, extension B initiates a tentative transfer by a switchhook flash. Through circuit functions which will be fully described in the subsequent detailed description with reference to FIGS. 2 to 17, the central office trunk 107 is split between the line end (the end toward the central office) and the office end (the end toward the PBX extension), a bridge is placed across the line end whereby to "hold" the outside calling station A, and a dial transfer trunk is selected by controller 122 and connected through the office end of central office trunk to extension B.

Controller 122 selects the dial transfer trunk through a preference circuit in a manner which assures equitable assignment of the dial transfer trunks in accordance with the transfer requests. The exact circuit functions will be described in detail subsequently and it will be assumed in the present instance that the first transfer trunk of the group of five is assigned, this trunk being represented by captioned box 123. A register is now attached to the "free" end of transfer trunk 123 and extension B after receiving dial tone dials the code of extension C.

When extension C responds, extensions B and C may then converse, dial transfer trunk 123 and the office end of the split central office trunk 107 being included in this connection. The novel arrangement is such that either extension B or C may, if desirable, bring station A in on the connection which then comprises in effect a three-way conference circuit. This action is initiated by either extension B or C flashing and involves operation of a "cut-through" relay. The bridge across central office trunk 107 is, of course, removed as a step in this sequence of operations.

In the event that party C goes on hook the original connection between station A and extension B over central office trunk 107 prevails. On the other hand if party B goes on hook after the three-way conference circuit had been established as set forth above, then station A and extension C are connected over the line end of the central office trunk 107 and the dial transfer trunk 123; the office end of central office trunk 107 is now vacant or free since extension B has gone on hook.

Now if party C should decide that a transfer to extension D may be in order the signals for a transfer by flashing, the same action as that of party B when initiating the transfer. The central office trunk 107 is split as before and the bridge placed across the line end whereby to hold the outside station A. In this instance however, and this illustrates a novel and important feature of the invention, the register is attached to the office end of the central office trunk 107, which is vacant as extension B went on hook, and extension C after receiving dial tone dials the code of extension D through the dial transfer trunk 123 and the office end of the central office trunk in that order. In other words for the transfer from extension C to extension D, the dial transfer trunk operates in a direction opposite to that for the first transfer from extension B to extension C and the called extension is reached through the office end of the split central office trunk.

Now a third transfer from extension D to extension E would be effected the same (as to direction) as the first transfer from extension B to extension C while a fourth transfer from extension E to extension F would be effected the same as the second from extension C to extension D and so on. This assignment of the control of transfers between extensions to the transfer trunk and to the central office trunk in alternating succession permits an unlimited number of transfers and exhibits highly efficient utilization of the transfer trunks in view of their use for effecting transfers first in one direction and then in the opposite direction. This multidirectional functioning of one of the transfer trunks 123 is indicated in FIG. 1 by the directional legends adjacent to box 123 representing the transfer trunk.

Through circuit functions which will be described in detail subsequently, an extension attempting a connection to another extension preparatory to effecting a transfer and finding the extension in busy or don't-answer condition may return to the original connection by flashing. Through still other circuit functions, which too will be described in detail subsequently, the transfer trunks operate on a "dial 9 trunk access denied" basis. That is if extension B, for example, while connected to dial transfer trunk 123 as described had dialed "9" for access to an outside trunk, a special tone would be returned to the extension and the connection would be released. This feature prevents an outside party, as station A, from gaining access to an outside trunk through a transfer thereto effected by a PBX extension.

It will be understood that the five dial transfer trunks are assigned by controller 122 in such a manner as to serve on an equitable basis the transfer requests resulting from calls completed over the entire group of two-way central office trunks. The novel manner in which each dial transfer trunk may function in alternating opposite directions obviously results in an arrangement which is economical as to cost as well as to required space.

Coming now to a more detailed description of the specific illustrative embodiment of the invention with particular reference to FIGS. 2 to 17 of the drawing, the circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding or the like is preceded by a numeral indicating the figure of the drawing in which the apparatus appears, for example the winding of relay 4SR appearing in FIG. 4. Further, each contact designation is followed by a numeral in parentheses which indicates the figure of the drawing in which the contact appears, for example the designation "4SR–1(2)" indicates that contact No. 1 of relay 4SR appears in FIG. 2 while the relay winding, as pointed out above, appears in FIG. 4. In accord with usual circuit design, transfer contact pairs may be either early make-break (continuity) or early break-make (sequence transfer) as dictated by the particular circuit operational requirements.

*Transfer of station A from extension B to extension C*

Referring then to FIGS. 2 to 17 for detailed description of the contemplated arrangement, it will be assumed, as in the above general description, that the outside party A has been connected through the central office equipment and over the two-way central office trunk 107, i.e., central office trunk No. 0, of the PBX to extension B. (Trunk 107 is shown in detail particularly in FIGS. 2 and 3 with certain of the relays and relay paths being shown in the associated figures.) Also, as previously, it will be assumed that extension B, having concluded that a transfer of the call to extension C may be in order, flashes his switchhook in order to initiate a possible transfer. When the switchhook is depressed, relay 2S releases because of the opened station loop at extension B.

Relay 2S, released, releases relay 5S1 by opening the operate path therefore at the make contact of transfer pair 2S–1(5), and closes an operate path for relay 5FF from ground at the break contact of transfer pair 2S–1(5), break contact 4TR1–1(5) and make contacts 5RT–1(5) and 4SR–2(5). Relay 5S1, released, interrupts at make contact 5S1–1(2) the hold path for slow-to-release relay 2CT which starts to release.

When the switchhook is released and the station loop reclosed relays 2S, 5S1 and 2CT reoperate over their original operate paths. Also, at this time, with relay 5FF operated and held through its make contact 5FF–3(5), relay 5DR operates from ground, the make contact of transfer pair 2S–1(5), make contact 5FF–1(5), winding of relay 5DR to battery.

Relay 5DR, operated, closes a path for connection of battery through make contacts 5FF–2(4), 5RT–2(4), and 5DR–1(4), and break contact 5TTA–1(4) to lead 401 and thereover to operate relay 10TP0 in the controller circuit, this being the particular relay of the trunk preference circuit which is assigned to the central office trunk 0, the trunk which is involved in the connection currently being described and operation of which relay will indicate a transfer request. Relay 10TP0, operated, closes at the make contact of transfer pair 10TP0–1(11) an operate path for relay 11GPA0; upon operation of relay 11GPA0, relay 10TP0 locks to ground through the make contact of its transfer pair 10TP0–2(10) and make contact 11GPA0–1(10).

The controller circuit is also described in detail in a subsequent section "Selection of Other Transfer Trunks—Controller Circuit."

Select magnet 10S0 now operates from ground, make contact 11GPA0–2(10), make contact of transfer pair 10TP0–3(10), winding of select magnet 10S0 to the battery on lead 401. Relay 12GP also operates through make contact 11GPA0–3(12) and this is followed by operation of relay 12HMPA from ground, break contact 12HMT–1(12), make contact 12GP–1(12), the break contact of transfer pair 12STA–1(12), winding of relay 12HMPA to battery.

A path is now closed for operation of hold magnet 11H0 traced from ground, make contacts 10S0–1(11), 11GPA0–4(11), 12HMPA–1(11), winding of hold magnet 11H0 to battery.

Figure 13:
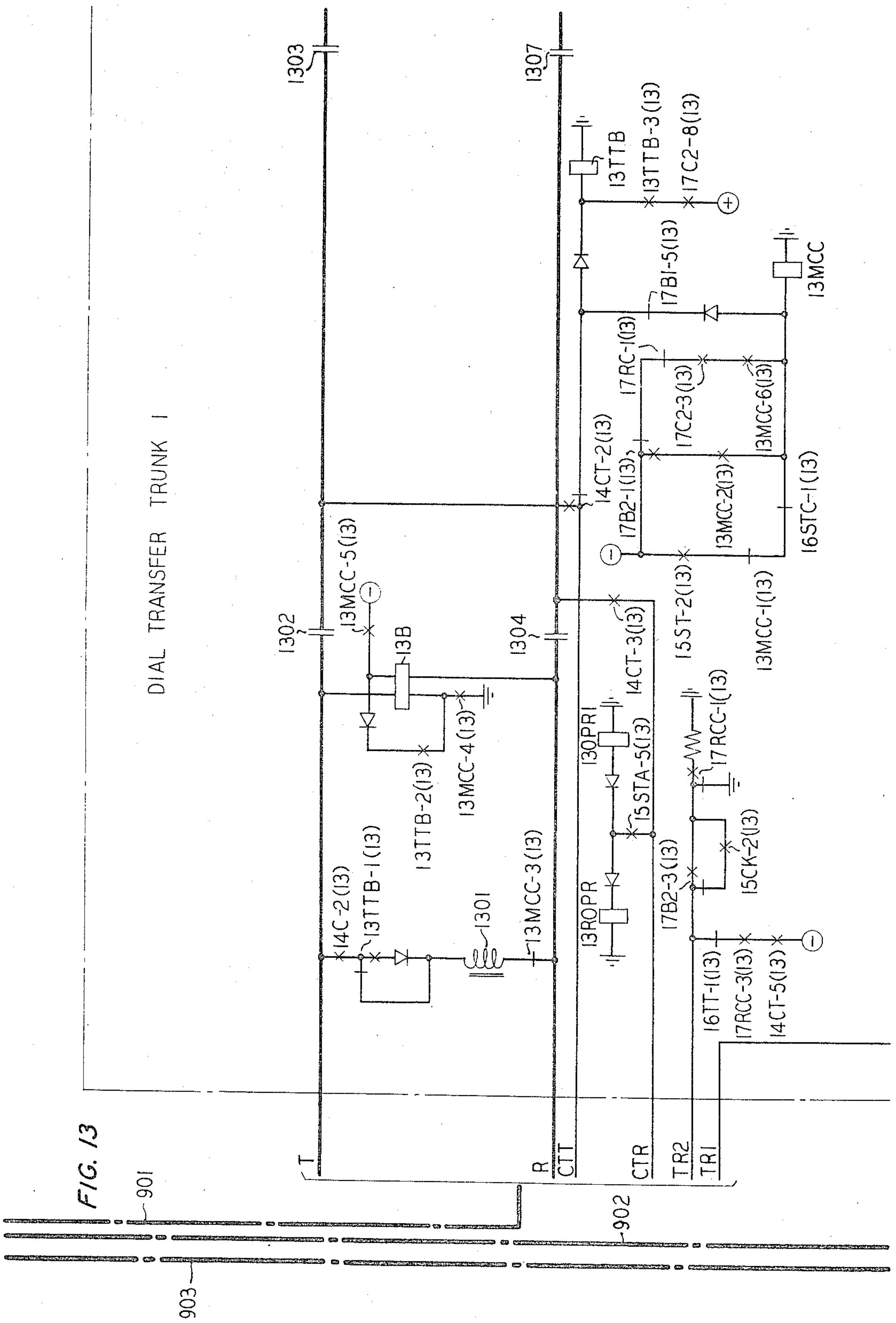
FIGS. 13, 14, 15, 16 and 17 show particularly the dial transfer trunks, one dial transfer trunk circuit being shown in detail and the others being indicated by captioned boxes and broken lines.

Operation of hold magnet 11H0 closes the crosspoints of switch V0, group 0, of crossbar switch T0 (FIG. 9); this is effective to connect leads of the two-way central office trunk 0 through to the selected dial transfer trunk No. 1 (FIG. 13). For purposes of clarity and in order to avoid complication of the drawing the connection of the various groups of leads is indicated by the use of heavy dot-dash lines representing cables together with suitable brackets. Thus the group of leads from central office trunk 0, which leads are arbitrarily designated as TR1, TR2, CTR, CTT, R and T, is connected through simulated cable 402 to horizontals of switch V0 and upon closure of the respective crosspoints the respective leads are connected on through cable 901 to the dial transfer trunk No. 1. Similarly, a group of leads from the hold magnets in the controller are connected to the associated crossbar switches through cable 1101.

When dial transfer trunk No. 1 is first seized, ground is applied to lead TR1 from the controller circuit through make contacts 10S0–1(11), 11GPA0–4(11), 12HMPA–1(11), 11H0–1(11), lead HM0, through cable 1101 to lead TR1; this ground operates relay 15ST through the break contact of transfer pair 16OPR–1(15), break contact 14CT–1(15), winding of relay 15ST, break contact 13OPR1–1(15), break contact 13ROPR–1(15), break contact of transfer pair 15STA–2(15) to battery; relay 15ST operates and applies ground to lead TR1 through make contact 15ST–1(15).

The ground applied to lead TR1 and transmitted thereover to the central office trunk 0 via cables 901 and 402 operates relay 4TR; this in turn is followed by operation of relay 4TR1 from ground, make contact 4TR–2(4), break contact 7AC–1(4), winding of relay 4TR1 to battery.

Figure 14:
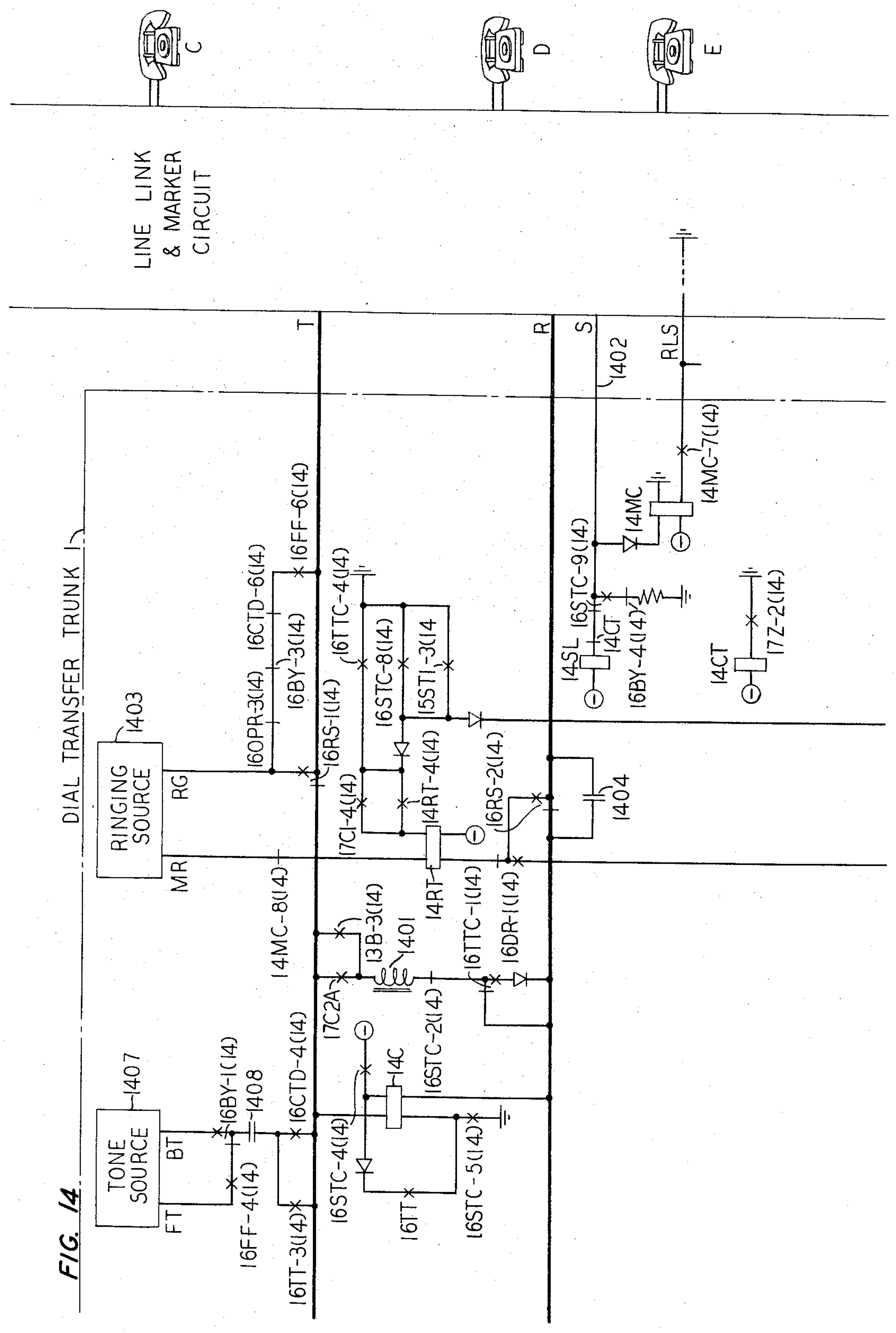
Figure 15:
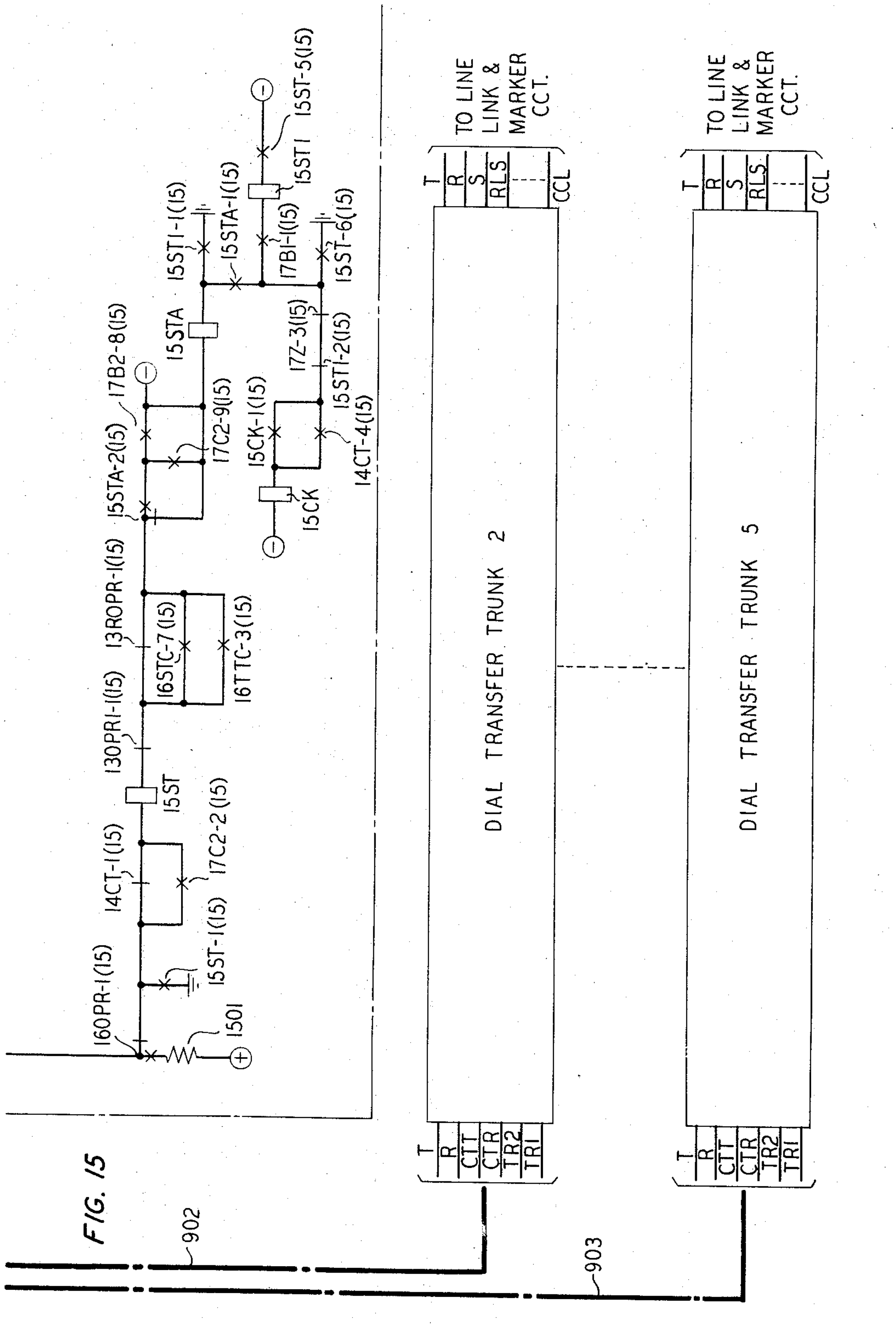
Figure 16:
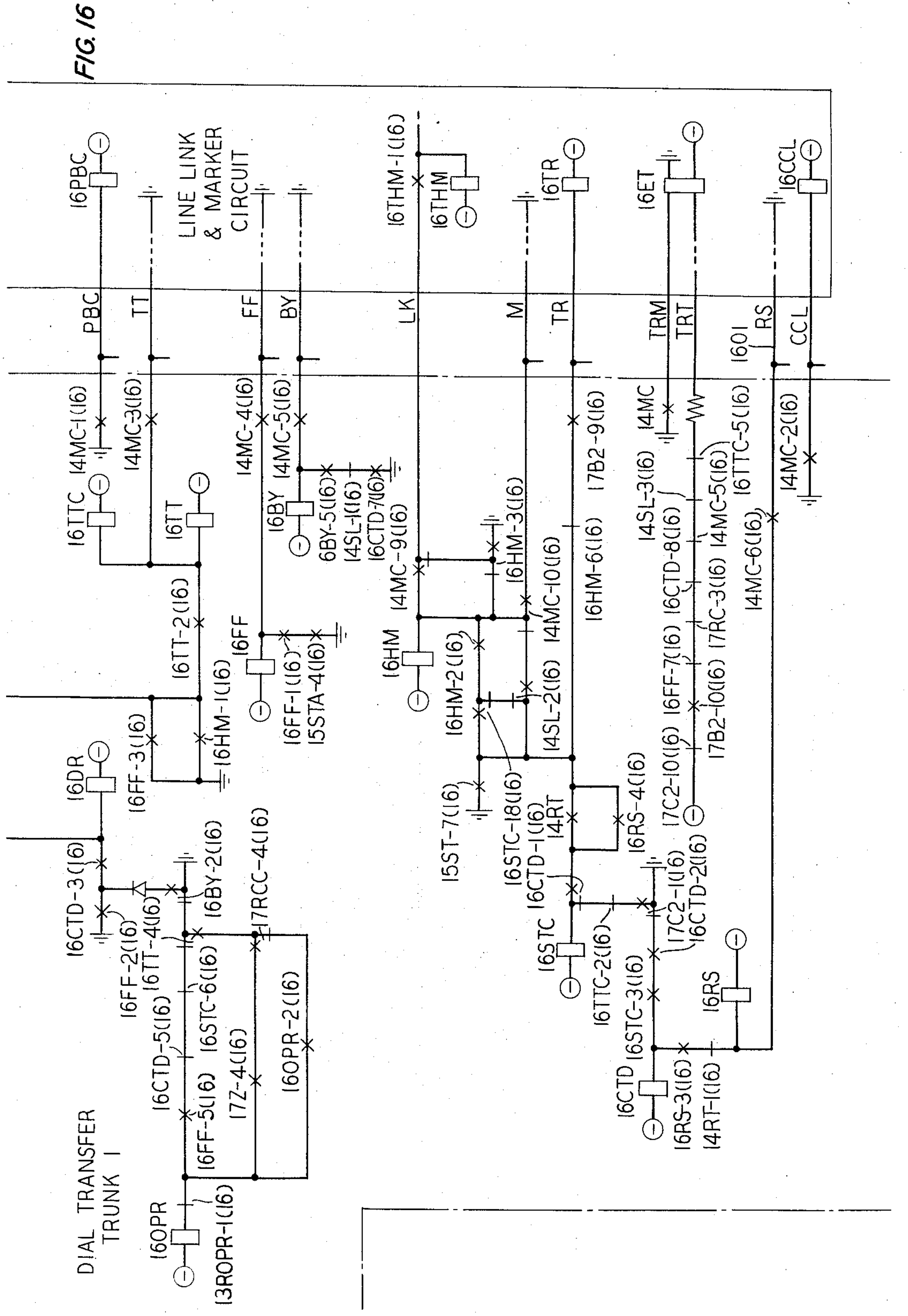
Figure 17:
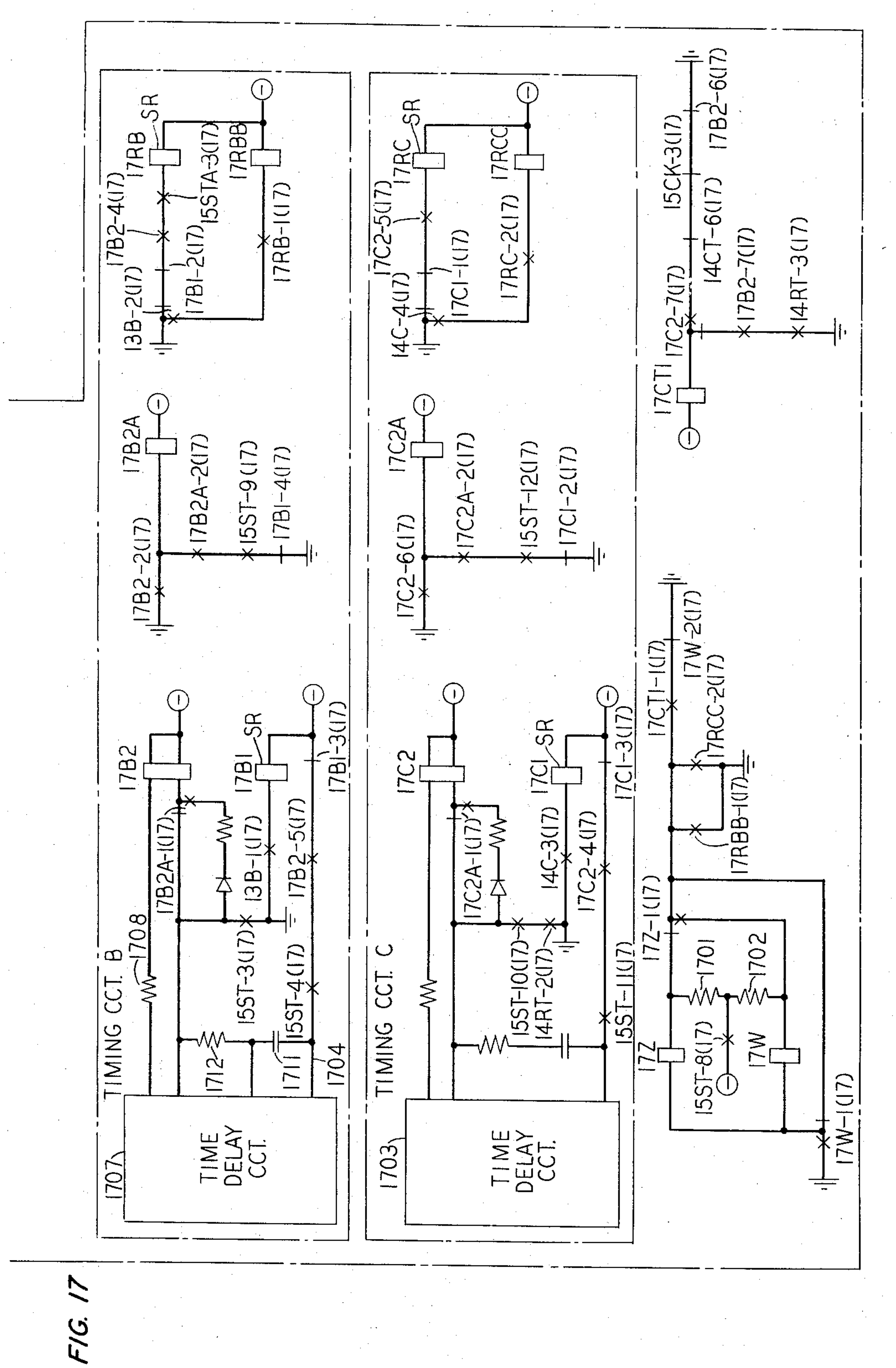
Figure 18:
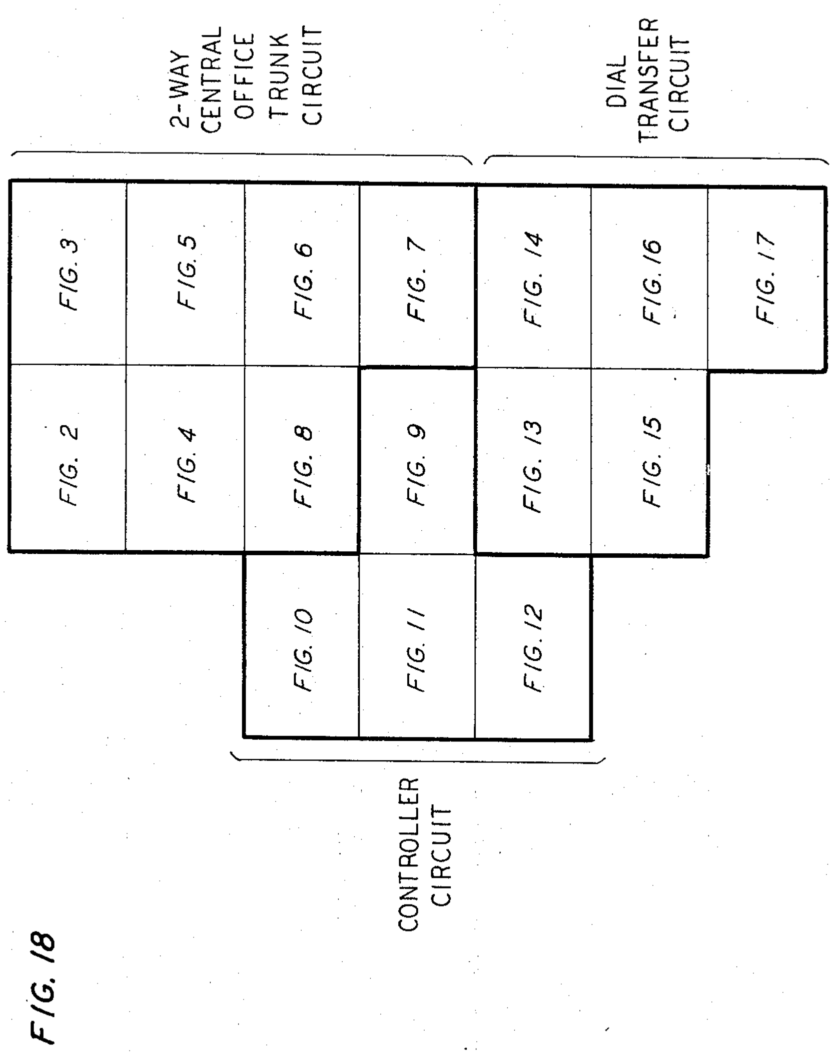
FIG. 18 shows the manner in which certain of the figures should be arranged to show the specific illustrative embodiment of the invention.

Since it will be important in subsequent description to identify specific ends of the transfer trunks and their "direction of operation" at different times, the left end of dial transfer trunk No. 1 as shown on the drawing, FIGS. 13 and 14, will be arbitrarily referred to as the "B end" because of the location of the 13B relay while the right-hand end will be refered to as the "C end" because of the location of the 14C relay. For purposes of consistency the left-hand ends of the other dial transfer trunks as shown on the drawing will also be referred to at the B ends and the right-hand ends as the C ends. It will be understood, of course, that these designations are arbitrary and for descriptive purposes alone, referring as they do to the pictorial showing of the respective trunks on the drawing.

As previously set forth above the two ends of the central office trunks are identified respectively as the "line end" connected through the central office to the outside party and the "office end" connected through the PBX circuits to the PBX extension.

Relays 4TR and 4TR1, operated as above described, connect relay 2TS across the tip and ring of the central office trunk, this connecting path including make contact 4TR–3(2), the make contact of transfer pair 4TR1–2(2), winding of relay 2TS, the make contact of transfer pair 4TR1–3(2) and inductor 201 and the make contact of transfer pair 4TR–7(2). Direct connections to the tip and ring are also made through leads 207 and 208 respectively. Connections of relay 2TS across the line permits monitoring the central office in the event of a disconnect by the calling party.

Also relay 4TR, operated, releases relay 5FF by interrupting the holding path at break contact 4TR–4(5); relay 5FF, released, releases relay 5DR by interrupting the operate path at make contact 5FF–1(5). Further, upon operation of relay 4TR the central office trunk is opened or split at the break contacts of respective transfer pairs 4TR–5(3) and 4TR–6(3) while the tip and ring of the office end of the trunk, that is the end connected to extension B, are connected through the make contacts of the same respective transfer pairs to the B end of the transfer trunk through cables 402 and 901. Outside station A is now cut off from the connection to extension B but the line end of the central office trunk to which he is connected is "held" by the above-described bridge placed there across through the make contacts of respective transfer pairs 4TR1–3(2) and 4TR1–2(2) and including as series elements inductor 201 and the winding of relay 2TS.

Relay 17B2 operates from ground, make contact 15ST–3(17), break contact of transfer pair 17B2A–1(17), lower winding of relay 17B2 to battery. Relay 17B2A now operates through make contact 17B2–2(17) and establishes a hold path for relay 17B2 through the make contact of transfer pair 17B2A–1(17); a hold path for relay 17B2A, in turn, is completed through make contacts 17B2A–2(17) and 15ST–9(17) and break contact 17B1–4(17). Relay 13MCC also operates from battery, make contact 15ST–2(13), break contacts 13MCC–1(13) and 16STC–1(13), winding of relay 13MCC to ground; relay 13MCC upon operating locks to the ground through make contact 13MCC–2(13) and the make contact of transfer pair 17B2–1(13).

Relay 13MCC, operated, opens the bridge connection for the transfer trunk at break contact 13MCC–3(13) and completes an operate path for relay 13B from battery, make contact 13MCC–5(13), right-hand winding of relay 13B, ring lead, closed station loop at PBX extension B, tip lead, left-hand winding of relay 13B, make contact 13MCC–4(13) to ground.

Relay 13B, operated, closes an operate path for relay 17B1 at make contact 13B-1(17); relay 17B1 upon operating closes an operate path for relay 15ST1 traced from battery, make contact 15ST–5(15), winding of relay 15ST1, make contacts 17B1–1(15) and 15ST–6(15) to ground; relay 15ST1, operated, closes an operate path at make contact 15ST1–1(15) for relay 15STA which operates and locks to ground through make contact 15STA–1(15).

Relay 17B2A, operating as above described following operation of relay 17B2, connects the ground at the break contact of transfer pair 17RCC–1(13) through the make contact of transfer pair 17B2–3(13) to lead TR2.

The marker now operating in its normal manner, as described for example in the Williams Patent 2,904,637 referred to above, functions to connect an originating register to the "free" or C end of the dial transfer trunk No. 1 and dial tone is returned to extension B in the normal manner.

Now the customer at extension B, which is of course connected to dial transfer trunk No. 1 via cables 402 and 901, upon receiving the dial tone proceeds to dial the code of PBX extension C. As the code of extension C is dialed, relay 13B "follows" the dial pulses since it is effectively connected across the station loop at extension B. Accordingly, make contact 13B–3(14) is effective to repeat these pulses to the register connected to the C end of the dial transfer trunk, the repeating action resulting from the alternate completion and interruption of the bridge through inductor 1401. After the register has received the complete dialed information it causes positive battery potential to be connected to the sleeve lead 1402 of the dial transfer trunk, this being effective to operate relay 14MC.

Relay 14MC, operated, initiates certain marker operations including the operation of marker relay 16PBC through make contact 14MC–1(16) and the operation of marker relay 16CCL through make contact 14MC–2(16). Also contacts are closed for operating relays of the transfer trunk circuit for terminating information provided certain conditions prevail in the marker. Included are make contacts 14MC–3(16) in the operate path of relay 16TT; make contact 14MC–4(16) in the operate path of relay 16FF; make contact 14MC–5(16) in the operate path of relay 16BY; and make contact 14MC–6(16) in the operate path of relay 16RS.

Relay 16RS operates when lead 1601 is grounded through marker action and ringing potential is then applied from ringing source 1403 through the make contacts of respective transfer pairs 16RS–1(14) and 16RS–2(14) to the transfer trunk and toward the dialed extension C. At this time audible ringing is capacitatively coupled through capacitor 1404 to the line for transmission to extension B.

Relay 16CTD operates following operation of relay 16RS from the ground on lead 1601 through break contact 14RT–1(16) and make contact 16RS–3(16), and this is followed by operation of relay 16STC from ground, make contacts 15ST–7(16) and 16RS–4(16), the make contact of transfer pair 16CTD–1(16), winding of relay 16STC to battery.

When extension C responds to the ringing by going off hook, relay 14RT operates on the ringing potential through the left-hand winding of the relay and through the closed loop at extension C. (Extension C is of course connected to the C end of the transfer trunk as identified above.) Relay 14RT, operated, trips the ringing by releasing relay 16RS by interrupting the holding path therefor at break contact 14RT–1(16); the ringing path is interrupted at the make contacts of respective transfer pairs 16RS–1(14) and 16RS–2(14).

Relay 14RT, operated, also closes at make contact 14RT–2(17) a path for operating relay 17C2 of timing circuit C which path also includes make contact 15ST–10(17) and the make contact of transfer pair 17C2A–1 (17). Timing circuit C is similar in general to timing circuit B. Relay 16CTD releases following operation of relay 17C2 since the holding path is interrupted at the break contact of transfer pair 17C2–1(16); relay 16STC holds operated however over a path now completed through the break contact of transfer pair 16CTD–1(16), break contact 16TTC–2(16) and the make contact of transfer pair 17C2–1(16) to ground. Talking battery and ground are now supplied over the tip [make contact 16STC–5(14) and break contact of transfer pair 16RS–1(14)] and over the ring [make contact 16STC–4(14) and break contact of transfer pair 16RS–2(14)] to extension C which is connected to the C end of the transfer trunk whereby extensions C and B are now in talking connection over dial transfer trunk No. 1 and the office end of central office trunk 0.

It should be kept in mind that, when effecting the connection between extensions B and C, extension B was first connected to the B end of the transfer trunk after which the originating register was connected to the C end of the trunk. Subsequent to dialing extension C, that extension was connected to the C end of the dial transfer trunk. Thus in setting up the first transfer, the dial transfer trunk operates in effect from left to right as pictured on the drawing.

*Outside party A added to connection*

During the conversation between extensions B and C it may be found desirable to add the outside party A in on the connection, that is to effect a three-way conference connection between station A and extensions B and C. This may be brought about by either extension B or extension C flashing their switchhook. Let us assume first that extension B flashes for cut-through of station A.

When the switchhook is depressed at extension B relay 13B releases as the station loop is open; this is followed by release of relay 17B1 as the operate path thereof is interrupted at make contact 13B-1(17). Relay 17RB now operates from ground, break contact of transfer pair 13B-2(17), break contact 17B1-2(17), make contacts 17B2-4(17) and 15STA-3(17), winding of relay 17RB to battery. When the switchhook is released relays 13B and 17B1 reoperate and the operate path of relay 17RB is interrupted. Relay 17RB is slow to release, however, and before it has completely released relay 17RBB operates from ground, make contact of transfer pair 13B-2(17), make contact 17RB-1(17), winding of relay 17RBB to battery.

Relay 17W now operates from battery, make contact 15ST-8(17), resistor 1702, winding of relay 17W, break contact of transfer pair 17W-1(17), make contact 17RBB-1(17) to ground. Relay 17RBB now fully releases but in the meantime relay 17Z operates from battery, make contact 15ST-8(17), resistor 1701, winding of relay 17Z, make contact of transfer pair 17W-1(17) to ground.

Relay 17Z, operated, completes an obvious operate path through make contact 17Z-2(14) for "cut-through" relay 14CT. Leads CTR and CTT are coupled to the ring and tip of the central office trunk through respective capacitors 203 and 202, and upon operation of relay 14CT, as just described, leads CTT and CTR are connected to the tip and ring of the dial transfer trunk through the make contact of transfer pair 14CT-2(13) and make contact 14CT-3(13) respectively. [In order to avoid possible confusion it might be pointed out that a "cut-through" relay 2CT is associated with the central office trunk but is not involved in the present cut-through function. At this point relay 2CT is released but open contacts thereof are bypassed for present purposes by respective paths completed through make contacts 4TR-3(2) and 4TR-7(2).]

Now the three parties, outside station A and PBX extensions B and C are joined in a three-way conference circuit for conversation.

The cut-through could have been initiated by a flash of the switchhook at extension C instead of at extension B and would have been effected in a generally similar manner. The relays first involved when the switchhook at extension C was closed would be relays 14C and 17C1 both of which would release after which relays 17RC and 17RCC would operate similarly to the operation of relays 17RB and 17RBB as previously described. The operation of relays 17W and 17Z, with subsequent operation of the cut-through relay 14CT would have been as previously described except initiated by closure of make contact 17RCC-2(17) instead of make contact 17RBB-1(17).

*Extension C leaves three-way connection*

After the outside station A has been brought in on the connection either of the PBX extensions may, of course, disconnect upon completing their portion of the conversation. First let us assume that the added extension, that is extension C, leaves the three-way circuit whereby to restore the original connection between station A and extension B.

When extension C goes on hook, relay 14C releases since the station loop is open at extension C. Relay 17C1 releases following release of relay 14C and this is followed by operation of relay 17RC and, in turn, by release of relay 17C2 through functioning of the time delay circuit as described subsequently.

Relay 15ST releases, as the hold path is interrupted at make contact 17C2-2(15), and removes from lead TR1 the ground previously applied thereto through make contact 15ST-1(15). Removal of ground from lead TR1 releases relay 4TR of the central office trunk and this in turn releases relays 4TR1 and 2TS. The central office trunk is now restored to original, normal condition and station A and extension B are connected thereover as in the situation first assumed above.

*Extension B leaves three-way connection*

For purposes of further description let us assume now that with the three-way conference established, as previously described, it was decided that the conversation should be continued between station A and extension C alone, and that extension B accordingly goes on hook.

When extension B hangs up, relay 13B releases since the station loop at extension B is interrupted. Release of relay 13B is followed by release of relay 17B1 as the operate path is interrupted at make contact 13B-1(17). Relay 15ST1 releases following release of relay 17B1 as the hold path is interruped at make contact 17B1-1(15). Relay 17RB operates from ground through the break contact of transfer pair 13B-2(17), break contact 17B1-2(17), make contacts 17B2-4(17) and 15STA-3(17), winding of relay 17RB to battery. With relay 17B1 released, battery is now applied over lead 1704 of time delay circuit 1707 through break contact 17B1-3(17), and make contacts 17B2-5(17) and 15ST-4(17).

Time delay circuit 1707 (as well as time delay circuit 1703) may be any one of the many relay time delay circuits known in the art. For example, it may comprise a three-transistor circuit wherein the first two transistors are so connected as to comprise the equivalent of a single transistor with a forward-current transfer ratio close to unity. These two transistors will remain cut-off until the external timing capacitor has charged sufficiently to allow the base of one transistor to become positive with respect to the emitter. At this point the two transistors start to conduct; this causes the base of the third transistor to become negative with respect to its emitter and drive the transistor into saturation. Saturation of the transistor applies ground to the external relay causing operation thereof. Upon removal of voltage from the circuit the relay releases and the timing capacitor discharges. It will be assumed for purposes of description that the general arrangement of the time delay circuits 1707 and 1703 is as just described.

Accordingly, as battery is applied to lead 1704 as just described, capacitor 1711 is charged. The delay interval will be determined by the characteristics of capacitor 1711 and resistor 1712 and will be assumed in the present instance to be two seconds; the delay is introduced to prevent undesired releases due to unintentional switchhook "taps" and the like. The transistor circuit will remain OFF until capacitor 1711 has charged to a sufficient potential to allow the base of one transistor to become positive with respect to its emitter; at this point the delay circuit functions to connect ground to lead 1708. The upper winding of relay 17B2 is now energized in opposition to the lower winding and relay 17B2 releases. Relay 17RB releases, following release of relay 17B2 as the operate path is interrupted at make contact 17B2-4(17).

While relay 17B2 is operated, ground is applied through the make contact of transfer pair 17B2-3(13) to lead TR2 as pointed out above. This ground applied, in turn, over leads 403, 601 and 602 holds relay 6HM1 operated. Relay 6HM1, operated, closes at make contact 6HM-1(6) an operate path for hold magnet 6HM. Now when relay 17B2 releases, as above described, this ground is removed and hold magnet 6HM releases whereby to release extension B from the office end of two-way central office trunk 0 by opening the S lead at make contact 6HM-3(3).

Outside station A and PBX extension C are now connected for conversation through the line end of the central office trunk 0 and the dial transfer trunk No. 1; the office end of the central office trunk is now free since extension B has gone on hook.

*Second transfer—Extension C to extension D*

For purposes of further description let us assume that, with station A and extension C connected as above described, it be decided that extension D should be brought in for conversation with possible subsequent transfer of the call to that extension. Extension C accordingly flashes for initiation of a connection to extension D.

Previous actions incident to cut-through to station A, circuit actions following hangup of extension B, and the like will not be again described at this point in order to avoid unnecessary complication of the disclosure. Where necessary for purposes of clarity, a relay may be described as "operated" or "released" referring to its condition resulting from these previous circuit functions.

When the switchhook at extension C is depressed by the flash, relay 14C releases since the station loop is open at extension C. Relay 17C1 releases, following release of relay 14C and this causes operation of relay 17RC through the break contact of transfer pair 14C–4(17), break contact 17C1–1(17) and make contact 17C2–5(17). Relay 13MCC now releases since the hold path previously completed through make contacts 13MCC–6(13) and 17C2–3(13), break contact 17RC–1(13) and the break contact of transfer pair 17B2–1(13) is now interrupted at break contact 17RC–1(13). Relay 13MCC, released, interrupts at make contacts 13MCC–4(13) and 13MCC–5(13) the ground and battery paths through the respective windings of relay 13B and partially closes at break contact 13MCC–3(13) the bridging connection through inductor 1301.

Now when the switchhook is released at extension C and the station loop reclosed, relays 14C and 17C1 reoperate. Relay 17RCC operates following reoperation of relay 14C after which relay 17RC releases. It should be kept in mind that at this time relays 17W and 17Z are in operated condition together with relay 14CT incident to the previous cut-through of station A. It should also be kept in mind that prior to the connection of extensions C and D, station A should be cut off from the connection at least until the two extensions have been connected for preliminary conversation.

With relay 17RCC now operated, as just described, relay 17W releases since the operating battery therefor at make contact 15ST–8(17) is shunted to ground through resistor 1702, the make contact of transfer pair 17Z–1(17) and make contact 17RCC–2(17). (Relay 17RC is slow to release and the function just described is completed before relay 17RC has fully released.)

When relay 17RC has fully released the operate path of relay 17RCC is interrupted and the relay releases. Relay 17Z now releases since one path to ground for the operate path is interrupted at the make contact of transfer pair 17W–1(17) and the other at make contact 17RCC–2(17). Relay 14CT releases following release of relay 17Z, since the operate path is interrupted at make contact 17Z–2(14); relay 14CT released interrupts at the make contacts of respective transfer pairs 14CT–2(13) and 14CT–3(13) the paths over which the connection of the dial transfer trunk is cut through to station A.

Before the full release of relay 14CT described above, relay 15CK operates from ground, make contact 15ST–6(15), break contacts 17Z–3(15) and 15ST1–2(15), make contact 14CT–4(15), winding of relay 15CK to battery, and, upon operating, locks to the same ground through make contact 15CK–1(15).

Relay 4ST operates following the operation of relay 17RCC as described above and before the release of relay 14CT, from battery, make contacts 14CT–5(13) and 17RCC–3(13), break contact 16TT–1(13), TR2 lead, break contact 5RT–3(4) and the break contact of transfer pair 4ST–1(4), winding of relay 4ST, break contact 6HM–1(4) to ground. Relay 4ST, operated, closes certain paths to the marker including a path from ground, break contact 3SL–2(6), make contact 4ST–2(6), make contact of transfer pair 4TR–9(6) through the winding of marker relay 6TR0 to battery whereby to operate that relay.

Relay 6TR0, operated, causes the marker to function in its normal manner to attach a register to the office end of central office trunk 0, which is free or open following hangup by extension B, and to subsequently return dial tone over the dial transfer trunk to extension C.

Included in the above marker-controlled functions at this time are the operation of the trunk hold magnet 6THM and hold magnet 6HM; relay 4ST releases following operation of hold magnet 6HM as the hold path is opened at break contacts 6HM–1(4) and 6HM–2(4). Also relay 3SL operates at this time through marker action.

Upon receiving dial tone, extension C may now dial the code of extension D. It will be recalled that extension C is connected to the C end of dial transfer trunk No. 1; that outside station A has been excluded from the connection by release of relay 14CT but is being held by the bridge across the line end of two-way central office trunk 0; and that the originating register is connected to the office end of the central office trunk. It will be recalled, further, that relay 14C is operated, the station loop at extension C being closed, and that relay 13B is released. The pulse repeating bridge across the C end of the transfer trunk is open at break contact 16STC–2(14) while the pulse repeating bridge across the B end of the transfer trunk is closed at make contact 14C–2(13).

Accordingly, as extension C dials the code of extension D, the impulses are repeated at the B end of the transfer trunk by the action of make contact 14C–2(13).

The marker now functions in its normal manner as described, for example, in the Williams Patent 2,904,637 referred to above. Relay 5MC of the central office trunk circuit, which has a "marginal release" characteristic, operates at this point through marker action and, in turn, closes at make contact 5MC–3(5) a path for operating marker relay 5PBC and closes at make contact 5MC–4(6) an operate path for relay 6CCL of the marker. Relay 5RS of the two-way trunk circuit operates at this point through marker action, make contact 5MC–5(5) being included in the operate path, and ringing potential from source 501 is applied to the office end of the central office trunk through the make contacts of respective transfer pairs 5RS–1(3) and 5RS–2(3), lead 502 being included in the ringing path. Ringing induction is supplied to extension C over the T and R leads of cables 402 and 901 and through capacitors 1302, 1303, 1304, 1307 and 1404.

When extension D, now connected to the office end of central office trunk No. 0, responds to the ringing and goes off hook, relay 5RT operates on the ringing potential through the left-hand winding, lead 502, through the closed station loop to ground at the make contact of transfer pair 5RS–1(3); relay 5RT, upon operating, locks through its make contact 5RT–4(5), break contact 5RR–1(5), make contact 6HM1–2(5), to ground at break contact 7AC–3(5). Relay 5RT, operated, releases relay 5RS by interrupting the hold path thereof at break contact 5RT–5(5). Relay 5RS, released, removes the ringing potential from the trunk at the make contacts of transfer pairs 5RS–1(3) and 5RS–2(3) and cuts through the tip and ring of the line at the break contacts of the same respective transfer pairs.

Extension C is now connected for conversation with extension D through transfer trunk No. 1, the T and R leads through cables 901 and 402, and the office end of central office trunk No. 0. Either extension C or D may now flash to cut through the outside station A and establish a three-way conference circuit between station A and extensions C and D, the circuit functions being as described above in connection with the first-established three-way conference circuit between station A and extensions B and C. Also, after the three-way connection has been established, if extension D goes back on hook the connection will be maintained between station A and extension C while if extension C goes on hook a connection will be maintained over the two-way central office trunk between station A and extension D; the circuit functions involved are similar to those discussed above in reference to the first three-way conference circuit between station A and extensions B and C.

It will be observed that in preparing for the second transfer, that is from extension C to extension D, the dial transfer trunk operated, in effect, from the C end toward the B end, this being the opposite of the direction of operation for the first transfer of extension B to C. This relationship is indicated schematically by arrows and captions in FIG. 1. The novel arrangement of each dial transfer trunk is such, as pointed out above, that the transfer trunk operates in alternate different directions for alternate transfers, provided, of course, that the initiation of the transfer alternates between the extension connected to the dial transfer trunk and the extension connected to the central office trunk. Thus, if the next transfer is initiated by extension D, now connected to the office end of the central office trunk, the dial transfer trunk will operate, in effect, from the B end toward the C end, while if a transfer is initiated by extension E, now assumed to be connected to the dial transfer trunk, that trunk will then operate, in effect, from the C end toward the B end, and so on.

A basic element in the novel arrangement of the transfer trunk which makes possible this alternate-direction operation is the control relay associated with each end of the trunk; that is in the illustrative embodiment described above, relay 14C provided at the C end of the transfer trunk and relay 13B provided at the B end of the trunk. These relays operating in the manner described in detail above, control the dialing in respectively opposite directions over the transfer trunk.

It is obvious that the novel arrangement of the dial transfer trunks, which permits their operation in respectively opposite directions as described, results in important savings both in equipment and circuit costs as well as from a space standpoint.

*Extension flashes-off before completion of connection*

It may happen that after an extension has initiated a pretransfer call to another extension, it will be found desirable to cancel the request before the connection has been completed. This may be desirable, for example, if the called extension does not respond promptly or is found to be in busy condition. The extension in such instance may "flash-off" and restore the original circuit condition.

For purposes of further description it will be assumed that, in the instance described above when extension B initiated a call to extension C preliminary to a transfer, extension B again flashed at the time extension C was being rung but before the extension had answered the ringing; extension B desires to restore the original connection with station A. The circuit will be assumed to be in the condition described above for ringing, relay 16RS being operated.

When the switchhook at extension B is depressed, relay 13B releases as the station loop at extension B is opened; this is followed by release of relay 17B1 as the operate path is opened at make contact 13B–1(17). Relay 17RB now operates from ground, the break contact of transfer pair 13B–2(17), break contact 17B1–2(17), make contacts 17B2–4(17) and 15STA–3(17), winding of relay 17RB to battery. Now when the switchhook is released, relay 13B reoperates and opens the operate path of slow-release relay 17RB. Relay 17B1 reoperates through make contact 13B–1(17) and relay 17RBB operates (before relay 17RB has fully released) through the make contact of transfer pair 13B–2(17) and make contact 17RB–1(17). Also before relay 17RB fully releases and, in turn, releases relay 17RBB, relay 17W operates from battery make contact 15ST–8(17), resistor 1702, winding of relay 17W, break contact of transfer pair 17W–1(17), make contact 17RBB–1(17) to ground; relay 17W locks to ground at the make contact of its transfer pair 17W–1(17). Following release of relay 17RBB, relay 17Z operates from battery, make contact 15ST–8(17), resistor 1701, winding of relay 17Z to ground at make contact of transfer pair 17W–1(17).

Relay 14CT operates on a path completed through make contact 17Z–2(14) and this is followed by release of relay 15ST as the hold path is interrupted at break contact 14CT–1(15). Release of relay 15ST restores the transfer trunk to normal condition by interrupting the various hold and operate paths completed through make contacts of that relay. Also, ground is removed at make contact 15ST–1(15) from lead TR1 and this causes release of relay 4TR, 4TR1 and 2TS of the central office trunk circuit. The CTT and CTR leads from the transfer trunk are disconnected at the make contacts of respective transfer pairs 14CT–2(13) and 14CT–3(13), while the T and R leads are disconnected from the central office trunk at the make contacts of respective transfer pairs 4TR–6(3) and 4TR–5(3). The tip and ring leads of the central office trunk are cut through at the break contacts of the two transfer pairs last mentioned.

Relay 2S now operates through the closed station loop at extension B and this is followed by operation of relay 5S1 through a path completed at the make contact of transfer pair 2S–1(5). Relay 2H now operates from ground on the tip of the line through the upper winding, the make contact of transfer pair 5S1–2(2), break contact 4SR–1(2), resistor 204 to battery. Cut-through relay 2CT of the central office trunk now operates from ground, make contact 2H-1(2), break contact of transfer pair 5FF-5(2), winding of relay 2CT to battery. Relay 4SR operates over a path completed through make contact 2CT–5(4) whereby to complete a hold path for relay 2CT through its make contact 2CT–1(2), the make contact of transfer pair 4SR–3(2) and make contact 5S1–1(2) to ground. Relay 2CT, operated, cuts through the tip and ring of the central office trunk at the make contacts of respective transfer pairs 2CT–2(2) and 2CT–4(2), the holding bridge across the trunk having been removed by the release of relays 4TR and 4TR1 as described above.

The central office trunk is now closed through between outside station A and extension B and transfer trunk No. 1 is in normal condition.

It will be recalled that the operations just described above assumed that extension B "flashed off" during the time extension C was being rung and prior to response to the ringing. It may also happen of course that the extension being dialed is found to be in "busy" condition. For purposes of further description it will be assumed now that, in the first transfer initiation described above, extension C when dialed by extension B was busy.

After operation of relay 14MC through normal marker functioning, relays 16RS, 16BY and 16FF operate through paths completed through make contacts of relay 14MC and controlled by marker functions. Relay 16CTD operates following operation of relay 16RS over a path completed through make contact 16RS–3(16); relay 16STC also operates at this time over a path completed through make contact 16RS–4(16) and the make contact of transfer pair 16CTD–1(16). Relay 16DR operates from ground through make contacts 16FF–2(16) and 16CTD–3(16), winding of relay 16DR to battery. Relay 16DR, operated, interrupts at the break contact of transfer pair 16DR–1(14) the connection of ringing potential from source 1403 to the ring lead of the transfer trunk; busy tone from tone source 1407 is connected through capacitor 1408 and the make contact of transfer pair 16BY-1(14) and make contact 16CTD–4(14) to the tip side of the transfer trunk for transmission back to the central office trunk and on to extension B.

Extension B upon receiving the busy tone now may flash off in order to restore the original connection with station A. Following depression of the switchhook the ensuing circuit operations in restoring the transfer trunk to normal condition and reconnecting station A through the central office trunk to extend B are the same as described above in connection with the flash off by extension B during the time extension C was being rung.

It will be understood that any extension, while connected to the central office trunk and after having initiated a pretransfer connection to another extension, may flash off before completion of the new connnection and return the original connection in the same general manner as just described above in reference to extension B.

*"Dial 9 access" calls denied*

As pointed out above, it is desirable that access by an outside station to outgoing trunks from the private branch exchange through transfer thereto by a PBX extension be prevented. That is, in the present illustrative embodiment, after a connection has been established over a central office trunk between outside station A and PBX extension B, extension B should not be enabled to effect a transfer whereby to connect station A to an outside trunk from the PBX. In many instances in present day practices, special calling privileges are afforded PBX extensions and it is obvious that an outside caller should not be able to gain access to such services through the act of a PBX extension user even though such action might well be inadvertent and with no actual intent to defraud. In accordance with a novel feature of the present arrangement such action is prevented; for purposes of further description let us assume now that extension B attempts to gain access to an outside trunk for subsequent transfer thereto of outside station A.

Accordingly, extension B dials "9," the usual access code to an outside trunk; relay 13B follows the dialing as previously described above. (The trunk has been connected to a register and dial tone was returned to extension B by circuit operations previously described above.) The originating register seizes a marker which functions in the normal manner; relay 14MC operates through marker action. Relays 16FF and 16TT operate through paths completed from the marker and including make contacts of relay 14MC; relay 16FF, operated, locks to ground through its make contact 16FF–1(16) and make contact 15STA–4(16) and relay 16TT, operated, locks to ground through its make contact 16TT–2(16) and make contact 16FF–3(16). Relay 16TTC also operates and locks over the same respective paths as relay 16TT.

At this point a warning tone is applied from tone source 1407 through make contact 16FF–4(14), capacitor 1408, and make contact 16TT–3(14) to the tip for transmission back to extension B as indication that the connection cannot be completed. A bridge is placed across the C end of the transfer trunk through the make contact of tarnsfer pair 16TTC–1(14).

Extension B upon receiving the warning tone may flash off and restore the original connection with station A by initiating circuit functions similar to those described above in connection with the procedure of flashing off upon finding the dialed extension in a busy condition.

*Extension dials attendant*

During a connection either extension involved may call in the PBX attendant by first flashing and then dialing "O." It will be assumed for purposes of further description that extension B takes this action after an originating register has been attached to the trunk and dial tone transmitted to extension B.

Relay 13B follows the dialing and the marker, after being seized by the register, functions in its normal manner; relay 14MC operates from the marker. Relay 16OPR now operates from ground, break contacts of respective transfer pairs 16BY–2(16), 16TT–4(16) and break contact 16STC–6(16), break contact 16CTD–5(16), make contact 16FF–5(16), break contact 13ROPR–1(16), winding of relay 16OPR to battery. Plus 48-volt potential is now applied over lead TR1 through resistor 1501 and the make contact of transfer pair 16OPR–1(15); this potential applied over lead TR1 via cables 901 and 402 operates relay 4OPR through the break contact of transfer pair 5FF–7(4), make contacts 4TR–12(4) and 6HM1–3(4), winding of relay 4OPR, break contact 7AC–4(4) and break contact 5TT–1(4) to ground. Respective paths are now completed at the make contact of transfer pair 4OPR–1(7) and make contact 4OPR–2(7) for transmission of 120 IPM signals over lead DL for flashing a lamp at the console and for transmitting battery potential over lead AUD to the position circuit for operating an audible signal. (The position circuit and the console are not described in detail herein since such details are not of particular significance in connection with the present invention and as an attempt is being made to limit the size and complexity of the disclosure insofar as feasible. The position circuit and console may be of the general arrangements discussed in detail in the Williams Patent 2,904,637 previously referred to above.)

The attendant alerted by the flashing lamp and the audible signal responds by operating a TRUNK key on the console (not shown). This results in certain circuit functions in the position circuit and finally in operation of relay 7ACA1 of the central office trunk; this is followed by operation of relay 7AC over a path completed from the position circuit and including make contact 7ACA1–1(7). Relay 7ACA1, operated cuts through leads from the position circuit (not shown) at make contacts 7ACA1–7(2), 7ACA1–6(2), 7ACA1–5(3), 7ACA1–4(3), 7ACA1–3(3) and 7ACA1–2(3).

Relay 13ROPR of the dial transfer trunk now operates from plus 48-volt battery applied to lead CTR through make contacts 7CA1–8(2), 4OPR–3(2), 4TR–13(2), through cables 402 and 901, make contact 15STA–5(13), winding of relay 13ROPR to ground. Relay 13ROPR, operated, releases relay 15ST by interrupting the operate path at break contact 13ROPR–1(15); relay 15ST, released, releases the several relays of the transfer trunk which are held operated through make contacts of the relay and the transfer trunk is restored to normal condition.

Relay 4OPR of the central office trunk releases as the operate path is interrupted at break contact 7AC–4(4) and this discontinues the audible and visual signal paths to the position circuit which were completed through the make contact of transfer pair 4OPR–1(7) and make contact 4OPR–2(7).

Relay 2S operates through the loop closed at the position circuit, to which relay 2S is connected through make contacts 7ACA1–7(2) and 7ACA1–6(2), and this is followed by operation of relay 5S1 through an obvious path. Relay 2H operates on a path completed through the make contact of transfer pair 5S1–2(2) and this is followed by operation of relay 2CT from ground, make contact 2H–1(2), the break contact of transfer pair 5FF–5(2), winding of relay 2CT to battery. Relay 4SR operates through make contact 2CT–5(4) whereby to establish a hold path for relay 2CT through make contact 2CT–1(2), make contact of transfer pair 4SR–3(2), make contact 5S1–1(2) to ground.

When ground was removed from lead TR1 by release of relay 15ST in the transfer trunk, relays 4TR and 4TR1 of the central office trunk released. All connections between the central office trunk and the transfer trunk are now interrupted. The position circuit is now connected to the office end of the central office trunk, and to extension B, through make contact 7ACA1–5(3), 7ACA1–4(3), 7ACA1–3(3) and 7ACA1–2(3), while the line end of the central office trunk, and station A, are excluded from this connection at break contact 7AC–5(2) and the break contact of transfer pair 7AC–6(3). The attendant may now provide such services on the connection as may be requested by extension B.

*Selection of other transfer trunks—Controller circuit*

In the above-described situation, it has been assumed that dial transfer trunk No. 1 is selected to serve a connection over central office trunk No. 0. It will be understood that connections between the other transfer trunks (assumed to be a total of five) and the other central office trunks (assumed to be a total of forty) are established in a generally similar manner. However, some further consideration of the controller circuit (FIGS. 9 to 12) at this point may be of interest.

Figure 9:
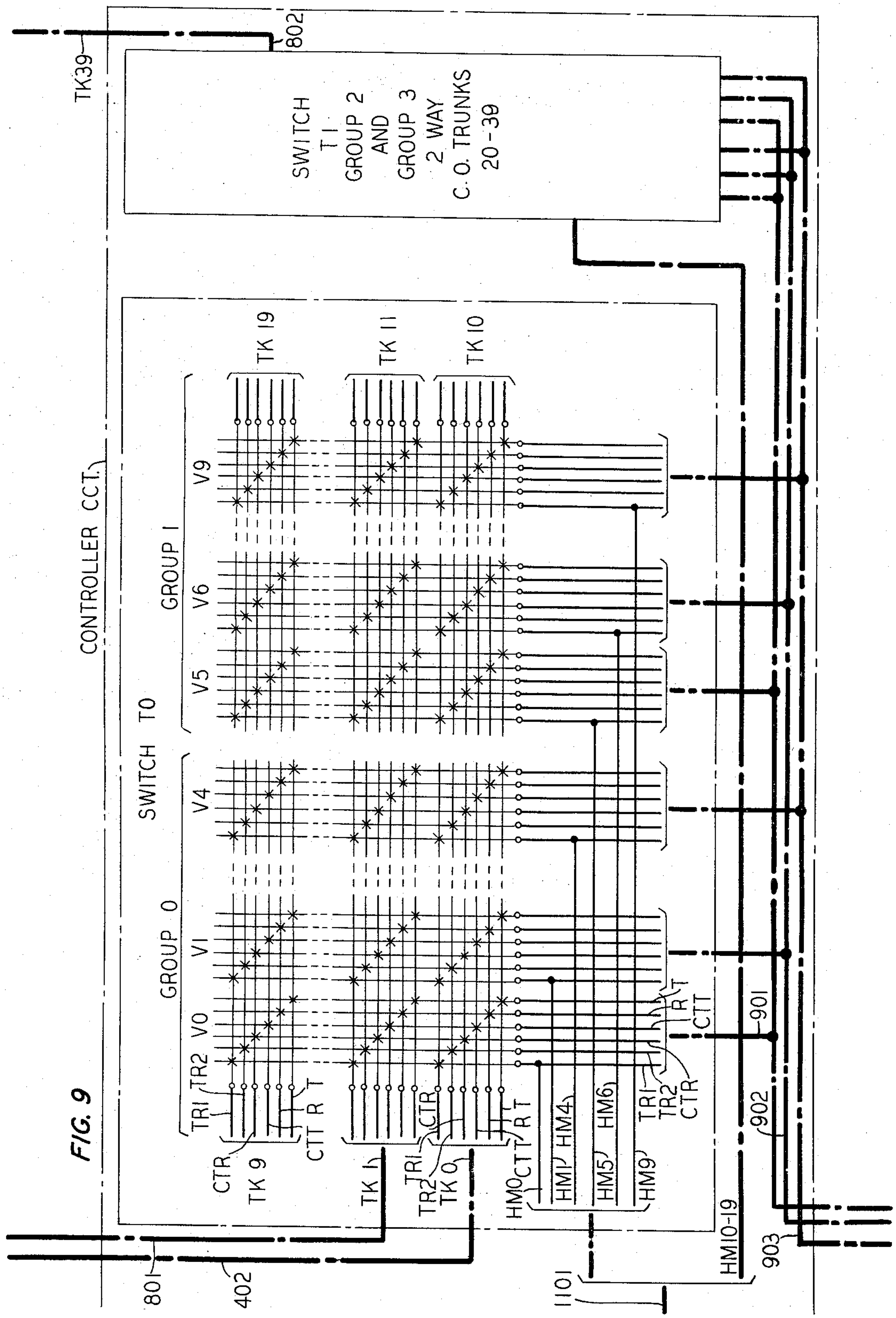
FIGS. 9, 10, 11 and 12 show particularly the controller circuit, the arrangement of one crossbar switch being shown in detail and the other switch being indicated by a captioned box.
Figure 10:
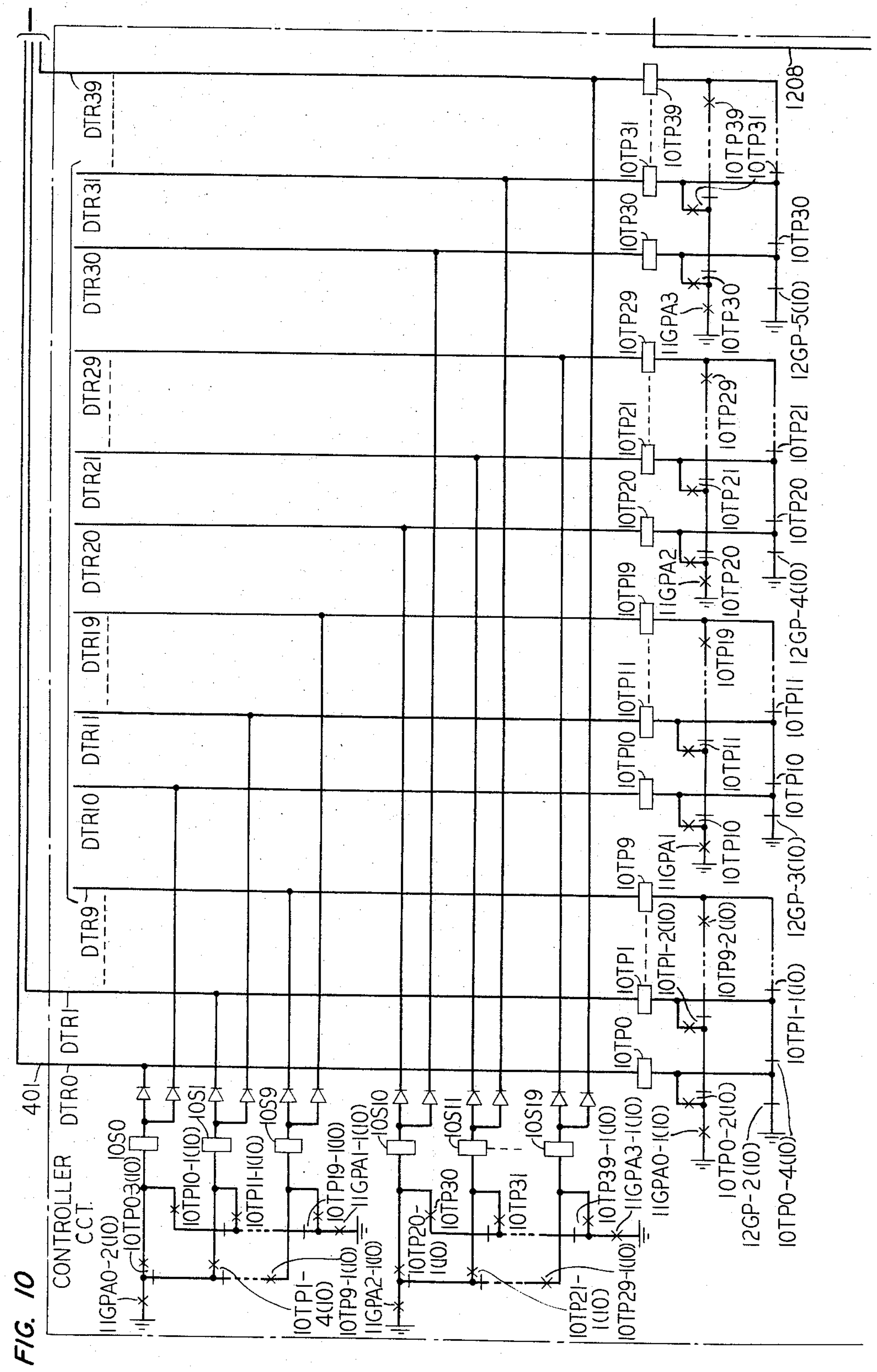
Figure 11:
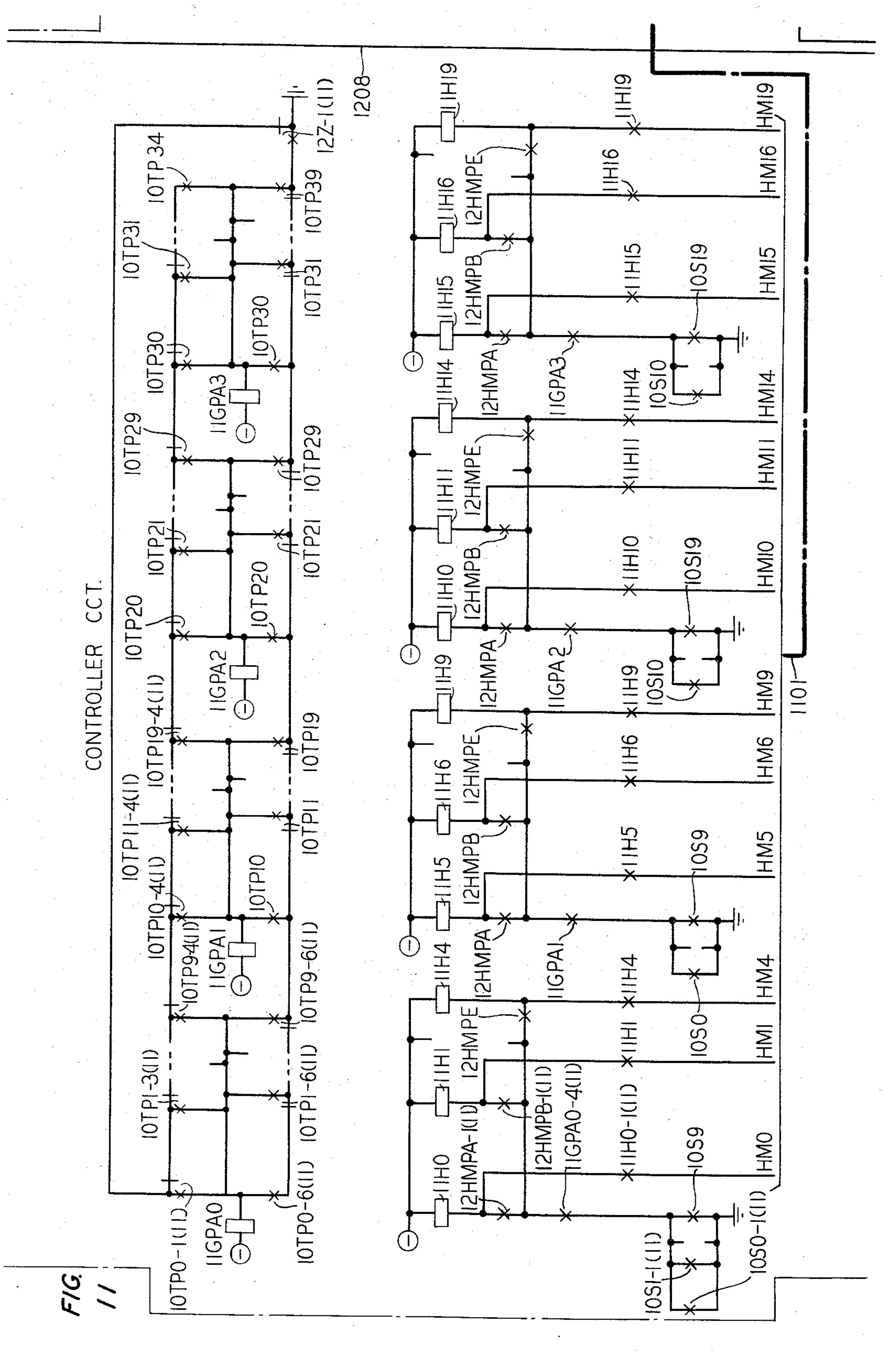
Figure 12:
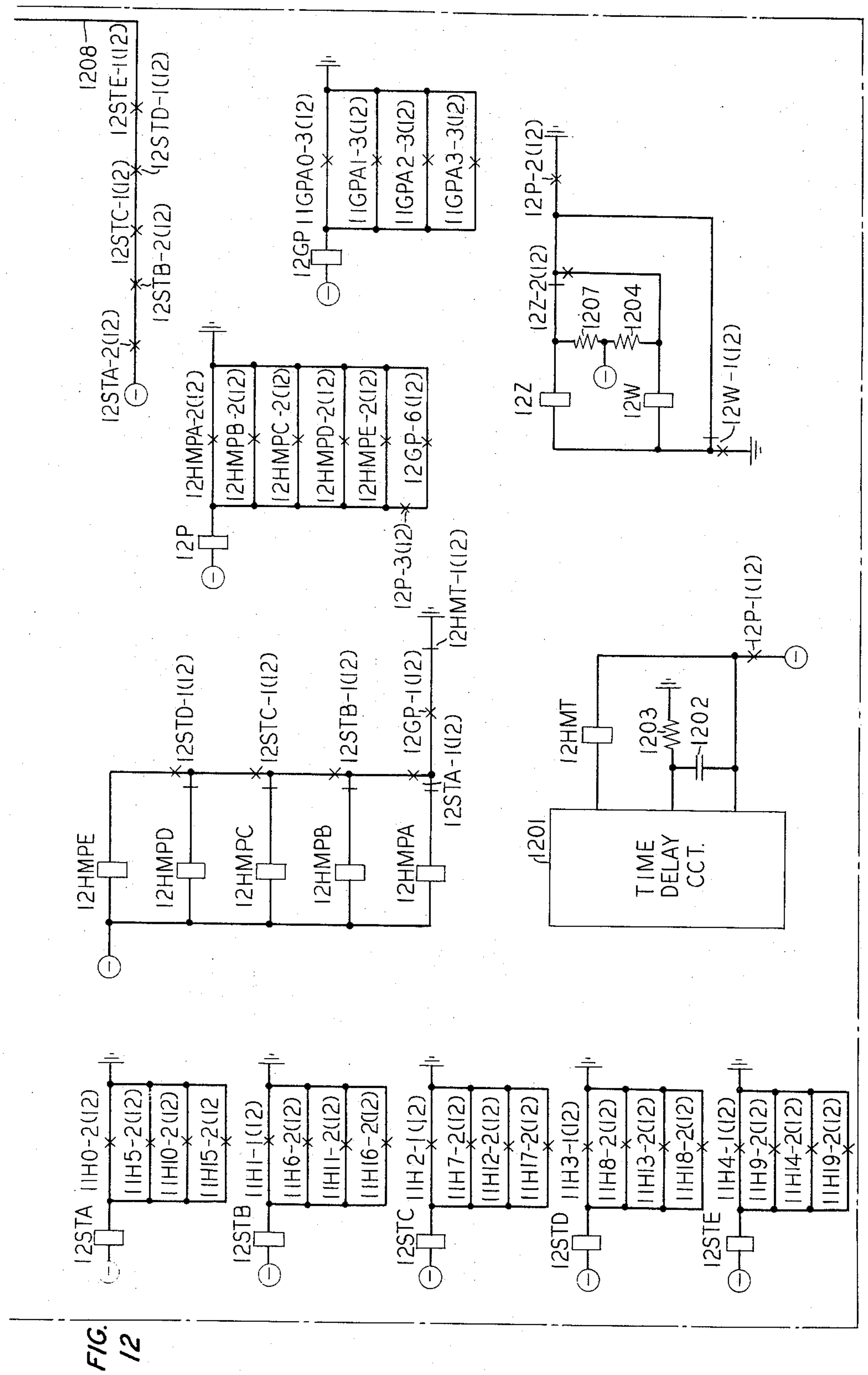

As indicated particularly in FIG. 9, the link switch utilized comprises one crossbar switch for each twenty central office trunks. Thus switch T0 as illustrated in part accommodates trunks 0 to 19 inclusive while switch T1, as indicated by the captioned box, accommodates trunks 20 to 39 inclusive. As indicated with regard to switch T0, the arrangement is such that each level of the switch accommodates two trunks, that is the first level accommodates trunks 0 and 10, the second accommodates trunks 1 and 11 and so on.

As previously pointed out above, the connection of leads of central office trunk 0 to the switch is indicated schematically as made via cable 402; similarly the connection of leads of central office trunk No. 1 will be assumed to be via cable 801 and the connection of leads of central office No. 39 via cable 802.

The dial transfer trunks have appearances on the verticles of the crossbar switch, and, since the switch is split in half as set forth above, the verticals are multipled consecutively within each switch and between the two switches. As previously set forth above, leads of dial transfer trunk No. 1 are connected to the switches via cable 901; similarly leads of dial transfer trunk No. 2 are connected to the switches via cable 902 and leads of dial transfer trunk No. 5 via cable 903.

The operation of the select magnets (10S0–10S19) is controlled by the trunk preference relays (10TP0–10TP39) and the group preference relays (11GPA0–11GPA3); a preference chain is provided for the hold magnets (11H0–11H19) so that the first idle hold magnet in the preference chain will always be chosen. A group relay is assigned for every ten trunk preference relays; the group relays are also in a preference chain whereby to prevent simultaneous operation.

For purposes of further description of the controller operation, it will be assumed that trunk preference relay 10TP1 is operated by battery applied over lead DTR1 from central office trunk No. 1. (The operations in the central office trunk or in the dial transfer trunk will not be described at this point since they are similar to operations previously described above.) Relay 10TP1 operates to ground through break contacts 10TP0–4(10) and 12GP–2(10) and this is followed by operation of relay 11GPA0 from ground, break contact of transfer pair 12Z–1(11), break contact of transfer pair 10TP0–1(11), make contact of transfer pair 10TP1–3(11), winding of relay 11GPA0 to battery. With relay 11GPA0 operated, a hold path for relay 10TP1 is now closed to ground through the make contact of transfer pair 10TP1–2(10), the break contact of transfer pair 10TP0–2(10) and make contact 11GPA0–1(10).

Select magnet 10S1 now operates from the battery on the DTR1 lead, winding of select magnet 10S1, make contact of transfer pair 10TP1–4(10), break contact of transfer pair 10TP0–3(10), make contact 11GPA0–2(10) to ground.

Relay 12GP operates from ground through make contact 11GPA0–3(12). Operation of trunk preference relays in any other group is now prevented since the respective operate paths are interrupted at break contacts 12GP–3(10), 12GP–4(10) and 12GP–5(10).

Relay 12HMPA now operates from ground, break contact 12HMT–1(12), make contact 12GP–1(12), break contact of transfer pair 12STA–1(12), winding of relay 12HMPA to battery. An operate path for hold magnet 11H0 is now closed through make contacts 10S1–1(11), 11GPA0–4(11) and 12HMPA–1(11), winding of hold magnet 11H0 to battery; the crosspoints of the switch are now closed in the normal manner for cutting the two-way trunk through to the transfer trunk. When the hold magnet 11H0 first operates, the ground at make contact 10S1–1(11) is applied through make contact 11H0–1(11) and lead HM0 to lead TR1 and operates relay 15ST of the transfer trunk as previously described. Also hold magnet 11H0, operated, closes a path at make contact 11H0–2(12) for operating relay 12STA.

Relay 12P now operates through make contact 12HMPA–2(12) and locks to ground through make contacts 12P–3(12) and 12GP–6(12). Relay 12P, operated, closes a path at make contact 12P–1(12) for activating time delay circuit 1201. This time delay circuit may be of any of the many types known in the art; for example it may be similar in arrangement to that of time delay circuit 1707 referred to above. The delay interval is determined by the characteristics of capacitor 1202 and resistor 1203 and it will be assumed for purposes of description alone that the delay interval is 50 milliseconds. At the end of the measured interval, relay 12HMT is operated and this releases relay 12HMPA by interrupting the operate path at break contact 12HMT–1(12).

Release of relay 12HMPA after this interval makes available, by opening make contact 12HMPA–1(11), the operate path to other hold magnets of the group; for example in the next series of operations, hold magnet 11H1 might be operated through make contact 12HMPB–1(11); since relay 12STA has operated, relay 12HMPB would operate at the next closure of contact 12GP–1(12) through the make contact of transfer pair 12STA–1(12) and the break contact of transfer pair 12STB–1(12).

It will be understood that following the release of relay 12HMPA, the hold magnet 11H0 is held to ground on lead TR1 applied through make contact 15ST–1(15).

Following operation of relay 12P, as described above, relay 12W operates from battery, resistor 1204, winding of relay 12W, break contact of transfer pair 12W–1(12), make contact 12P–2(12) to ground; relay 12W upon operating locks to ground at the make contact of transfer pair 12W–1(12). Through operations occurring after the central office trunk has been cut through to the transfer trunk, controller relays described above as operated now release; this includes the 12P relay.

Upon release of relay 12P and removal of the shunting ground at make contact 12P–2(12), relay 12Z operates from battery, resistor 1207, winding of relay 12Z to ground at the make contact of transfer pair 12W–1(12). It will be noted that a transfer pair 12Z–1(11) of relay 12Z controls the application of ground to the chain of group relays (11GPA0–11GPA3). Accordingly, relay Z functions to change the order of preference of the group relays during each operation by switching the operating ground from one end of the group chain to the opposite end.

When all hold magnets are operated, that is when all the dial transfer trunks are in use, all the relays in the group 12STA to 12STE will be operated since the operate paths are completed through make contacts of the hold magnets as 11H0–2(12), 11H1–1(12), 11H2–1(12), 11H3–1(12) and 11H4–1(12). Accordingly, under such a condition, battery will be connected to lead 1208 through make contacts 12STA–2(12), 12STB–2(12), 12STC–1(12), 12STD–1(12) and 12STE–1(12), and applied through make contacts 5FF–9(4) and 5DR–2(4) to the winding of relay 4OPR and through break contacts 7AC–4(4) and 5TT–1(4) to ground.

Relay 4OPR operates over the path just traced and completes a path through make contact 4OPR-4(7) for operation of relay 7ACA1 as well as for operation of certain relays in the attendant's circuit (not shown). As described above under the section "Extension Dials Attendant" operation of the 7ACA1 relay initiates certain functions which result in connecting the position circuit to the central office trunk and in energizing signals for alerting the attendant. The attendant is thus brought in on the connection and may inform extension B that all transfer trunks are busy.

The above-detailed description has been directed in the main to discussion of a connection originally established over central office trunk 0 between an outside station A and a PBX extension B and subsequently transferred over dial transfer trunk No. 1 to other PBX extensions. It will be understood, of course, that these are only typical situations selected for purposes of illustration and that other stations and PBX extensions would be serviced in a similar manner over this or different combinations of central office trunks and dial transfer trunks. In order to avoid unnecessary complication of the disclosure, the detailed description is being limited to the typical situations referred to. It will be understood, however, that in each instance the novel arrangement and function of the transfer trunk are involved whereby the trunk is utilized in alternate directions for successive transfers and wherein control of the transfer alternates between transfer trunk and central office trunk.

In short, it is to be understood that the above-described arrangements are illustrative of the principles of the invention. Numerous other arrangements may be devised by those skilled in the art without departing from the spirit and scope of the invention.

What is claimed is:

1. In an automatic telephone system, a private branch exchange, a plurality of central office trunks terminating at said private branch exchange, a plurality of extensions at said private branch exchange, means for completing a connection over one of said central office trunks between an outside station and a first one of said extension stations, means for temporarily interrupting said connection by splitting said one central office trunk between the office end and the line end, a transfer trunk at said private branch exchange, means activated by said first one of said extensions for seizing said transfer trunk and for completing a connection over said office end of said one central office trunk and said transfer trunk from said first extension to a second one of said extensions, means activated by either said first or said second extension for restoring said first-mentioned connection whereby to join said outside station and said first and second extensions in a connection for conversation, and means controlled by said second extension and effective upon said first extension going on hook for completing a connection over said transfer trunk and the office end of said central office trunk from said second extension to a third of said extensions.

2. In an automatic telephone system, the combination defined by claim 1 further characterized in means included in said transfer trunk for determining the respective end of said transfer trunk from which it is controlled when effecting a transfer.

3. In an automatic telephone system, the combination defined by claim 2 further characterized in that said last-mentioned means includes a first relay effectively connected at a first end of said transfer trunk and a second relay effectively connected at the second end of said transfer trunk, means controlled by an extension connected to said first end of said transfer trunk for operating said first relay, and means controlled by an extension connected to the office end of said one central office trunk for operating said second relay.

4. In an automatic telephone system, the combination defined by claim 3 further characterized in a first shunting bridge and a second shunting bridge, means controlled by said first relay for effectively connecting said first shunting bridge across the second end of said transfer trunk, and means controlled by said second relay for effectively connecting said second shunting bridge across the first end of said transfer trunk.

5. In an automatic telephone system, a private branch exchange, a plurality of central office trunks terminating at said private branch exchange, a plurality of extensions at said private branch exchange, means for completing a connection over one of said central office trunks between an outside station and a first one of said extensions, a plurality of transfer trunks at said private branch exchange, a controller also at said private branch exchange, means activated by said first one of said extensions for temporarily interrupting said connection by splitting said one central office trunk between the office end and the line end and placing a holding bridge across the line end, said last-mentioned means also being effective to activate said controller whereby to seize a respective one of said transfer trunks and to connect it to the office end of said one central office trunk, means for connecting registering and switching means to one end of said seized transfer trunk whereby said first extension may complete a connection through the office end of said one central office trunk and said seized transfer trunk to a second one of said extensions, and means controlled by said second extension and effective upon said first extension going on hook for connecting registering and switching means to the office end of said first central office trunk whereby said second extension may complete a connection through said seized transfer trunk and the office end of said one central office trunk to a third one of said extensions.

6. In an automatic telephone system, the combination defined by claim 5 further characterized in means included in said seized transfer trunk for determining the effective direction of operation thereof in completing a connection dependent upon whether the operation is initiated by said first extension connected to said one central office trunk or by said second extension connected to said seized transfer trunk.

7. In an automatic telephone system, the combination defined by claim 5 further characterized in the inclusion in said controller of a relay chain circuit, a source of operating ground potential for said relay chain circuit, and means for alternating the connection of said ground potential between the two ends of said relay chain circuit.

8. In an automatic telephone system, the combination defined by claim 7 further characterized in means for rendering said connection alternating means effective following each seizure of a transfer trunk.

9. In an automatic telephone system, a private branch exchange, a plurality of central office trunks terminating at said private branch exchange, a plurality of extensions at said private branch exchange, means for completing a connection over one of said central office trunks between an outside station and a first one of said extensions, a plurality of transfer trunks at said private branch exchange, a controller also at said private branch exchange, means activated by said first one of said extensions for temporarily interrupting said connection by splitting said one central office trunk between the office end and the line end and placing a holding bridge across the line end, said last-mentioned means also being effective to activate said controller whereby to seize a respective one of said transfer trunks and to connect it to the office end of said one central office trunk, means for connecting registering and switching means to one end of said seized transfer trunk whereby said first extension may complete a connection through the office end of said one central office trunk and said seized transfer trunk to a second one of said extensions, means controlled by said first extension and effective before completion of said connection to said second extension for restoring said first-mentioned connection with the outside station, and means effective after completion of said connection to said second one of said extensions and controlled by either said first or said second extension for restoring said first-mentioned connection whereby to join said outside station and said first and second extensions for conversation.

10. In an automatic telephone system, the combination defined by claim 9 further characterized in means effective upon said first extension dialing a predetermined code after said registering and switching means has been connected to said seized transfer trunk to return a warning tone to said first extension and to prevent the completion of the connection attempted by said dialing.

11. In a telephone switching system having telephone extensions and trunk circuits, a dial transfer circuit comprising a plurality of dial transfer trunks, means for connecting one end of a dial transfer trunk to one end of a trunk circuit and for placing a hold condition on the other end of said trunk circuit, and means for alternately dialing through said one end of said trunk circuit to said dial transfer trunk and dialing through said dial transfer trunk to said one end of said trunk circuit to establish successive dial transfer connections.

12. In an automatic telephone system, a private branch exchange including central office trunk circuits, a plurality of extensions, a dial transfer trunk, and means for effecting successive dial transfers of a connection through one of said central office trunk circuits, said means including means for alternately dialing through said dial transfer trunk circuit in opposite directions.

13. In an automatic telephone system, a private branch exchange including central office trunk circuits extending to a central office, a plurality of extensions, a dial transfer trunk, means for establishing a connection through one of said trunk circuits to one of said extensions, and means responsive to successive dial transfers for extending said connection to other of said extensions, said means including means for alternately establishing connection to dial pulse register means from the office end of said trunk and extending dial pulses from an extension to said dial transfer trunk in one direction and establishing connection to said dial pulse register means from said dial transfer trunk and extending dial pulses from an extension to said office end of said trunk circuit and through said dial transfer trunk in the opposite direction.

No references cited.

KATHLEEN H. CLAFFY, *Primary Examiner.*

A. H. GESS, *Assistant Examiner.*